United States Patent [19] | [11] 4,119,977
Moyroud | [45] Oct. 10, 1978

[54] PHOTOGRAPHIC TYPE COMPOSING MACHINE

[76] Inventor: Louis M. Moyroud, 202 Grove Way, Delray Beach, Fla. 33444

[21] Appl. No.: 763,611

[22] Filed: Jan. 28, 1977

[30] Foreign Application Priority Data

Jan. 29, 1976 [GB] United Kingdom ................. 3642/76

[51] Int. Cl.2 ...................... G03B 15/00; G03B 17/06; G03B 17/10

[52] U.S. Cl. ........................................... 354/7; 354/15

[58] Field of Search ...................... 354/5, 7, 13, 14, 15

[56] References Cited

U.S. PATENT DOCUMENTS

| | | | |
|---|---|---|---|
| 3,188,929 | 6/1965 | Higonnet et al. | 354/6 |
| 3,273,475 | 9/1966 | Moyroud et al. | 354/10 |
| 3,291,015 | 12/1966 | Moyroud | 354/14 |
| 3,416,420 | 12/1968 | Moyroud | 354/6 |
| 3,422,736 | 1/1969 | Moyroud et al. | 354/7 |
| 3,641,887 | 2/1972 | Moyroud | 354/17 |
| 3,643,559 | 2/1972 | Moyroud | 354/6 |
| 3,707,902 | 1/1973 | Purdy et al. | 354/7 |
| 3,896,454 | 7/1975 | Hosterman | 354/15 |
| 3,968,501 | 7/1976 | Gilbert | 354/7 |
| 4,044,290 | 8/1977 | Gullo | 354/7 X |

*Primary Examiner*—Richard A. Wintercorn
*Attorney, Agent, or Firm*—Curtis, Morris & Safford

[57] ABSTRACT

The machine provides access to a relatively large number of different characters located on relatively large spinning discs or drums. The characters are located in arrays such as concentric rows on a disc. A plurality of lenses is mounted on a lens carriage, and one or more light sources is mounted on a flash-lamp carriage. Character spacing is determined by motion of the lens carriage and/or the lamp carriage. Array selection is performed by motion of the lamp carriage, and/or motion of the lens carriage. Composition of lines or columns of characters taken from a relatively large number of different arrays, such as would be the case in type composition using Chinese ideographs, is speeded considerably by controlling the order in which the characters are projected so that the lens carriage need not reverse its direction of motion during composition of a line. A simple mechanism is used to change lenses for size changes by the selective use of stops at the ends of the travel path of the lens carriage. Two discs or drums can be used alternatingly to increase the number of characters available. A simple attachment is provided for composing long lines of enlarged characters for composing headlines and the like. This avoids the necessity of providing a separate headlining machine. Another simple attachment is provided for inserting Pi characters. This attachment makes use of the lamp carriage and drive mechanism in selecting the Pi characters for projection. A method which is especially useful in economically producing large matrix discs is described. An economical "floppy" or flexible film disc also is described. A system and method are described for electronically detecting base-line and spacing errors in the characters on the character matrix, storing the errors, and correcting the errors electronically during projection of the characters onto the photographic film.

5 Claims, 50 Drawing Figures

Fig.1.
Fig.1A.
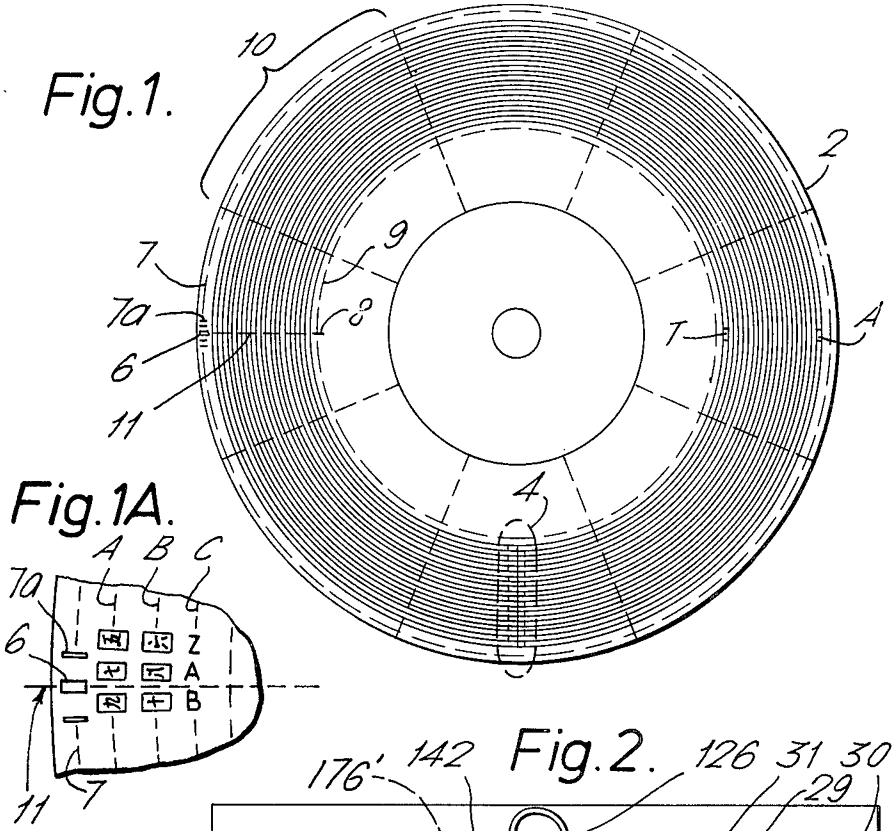
Fig.2.
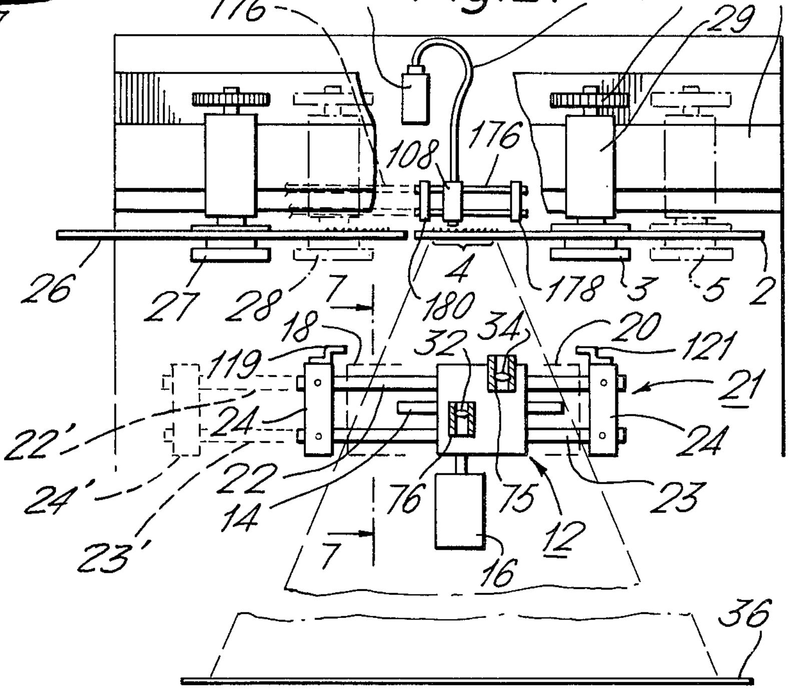

Fig. 8.
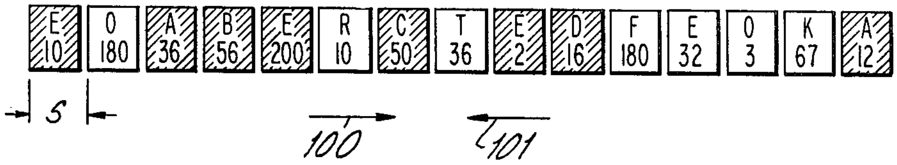
Fig. 9.
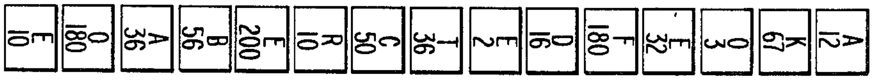
Fig. 13.
| POINT SIZE | DL |
|---|---|
| 5 | 125.0 |
| 6 | 136.3 |
| 7 | 145.8 |
| 8 | 153.8 |
| 9 | 160.7 |
| 10 | 166.6 |
| 11 | 171.8 |
| 12 | 176.4 |
| 14 | 184.2 |
| 18 | 195.6 |
| 24 | 206.9 |
| 30 | 214.3 |
| 36 | 219.5 |
| 48 | 226.4 |
Fig. 10.
| ROW | ROW VALUE |
|---|---|
| A | 9 |
| B | 18 |
| C | 27 |
| D | 36 |
| E | 45 |
| F | 54 |
| G | 63 |
| H | 72 |
| I | 81 |
| J | 90 |
| K | 99 |
| L | 108 |
| M | 117 |
| N | 126 |
| O | 135 |
| P | 144 |
| Q | 153 |
| R | 162 |
| S | 171 |
| T | 180 |
Fig. 11.
| CHAR LOC. | ROW VAL. | ACCUM WIDTH VALUE | DISPL. VALUE |
|---|---|---|---|
| E10 | 45 | 0 | 45 |
| 0180 | 135 | 7 | 142 |
| A36 | 9 | 14 | 23 |
| B56 | 18 | 21 | 39 |
| E200 | 45 | 28 | 73 |
| R10 | 162 | 35 | 197 |
| C50 | 27 | 42 | 69 |
| T36 | 180 | 49 | 229 |
| E2 | 45 | 56 | 101 |
| D16 | 36 | 63 | 99 |
| F180 | 54 | 70 | 124 |
| E32 | 45 | 77 | 122 |
| 03 | 135 | 84 | 219 |
| K67 | 99 | 91 | 190 |
| A12 | 9 | 98 | 107 |
Fig. 12.
| CHAR. LOC. | DISPL. VALUE | C | D | E |
|---|---|---|---|---|
| A36 | 23 | | 3.83 | 96 |
| B56 | 39 | 3 | .49 | 12 |
| E10 | 45 | 6 | .39 | 10 |
| C50 | 69 | 24 | 4.00 | 100 |
| E200 | 73 | 4 | .66 | 17 |
| D16 | 99 | 26 | 4.33 | 108 |
| E2 | 101 | 2 | .33 | 8 |
| A12 | 107 | 5 | .83 | 21 |
| E32 | 122 | 5 | .83 | 21 |
| F180 | 124 | 2 | .33 | 8 |
| 0180 | 142 | 18 | 3.00 | 75 |
| K67 | 190 | 48 | 8.00 | 200 |
| R10 | 197 | 7 | 1.66 | 30 |
| 03 | 219 | 22 | 3.66 | 92 |
| T36 | 229 | 10 | 1.66 | 42 |
43

Fig.27.
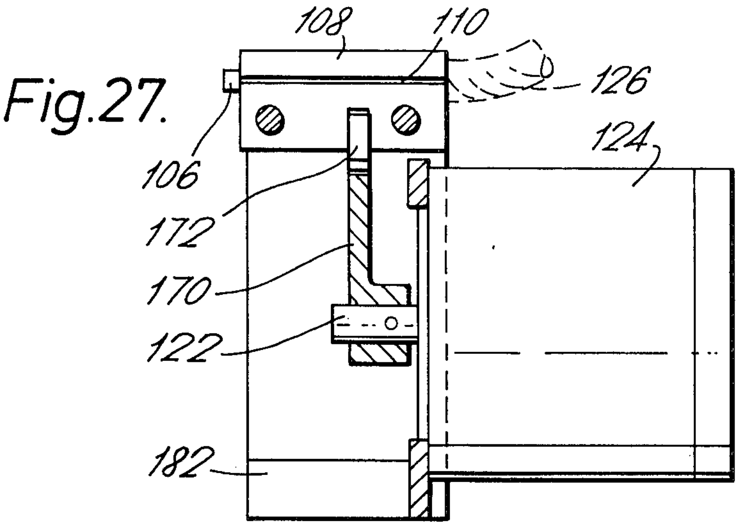
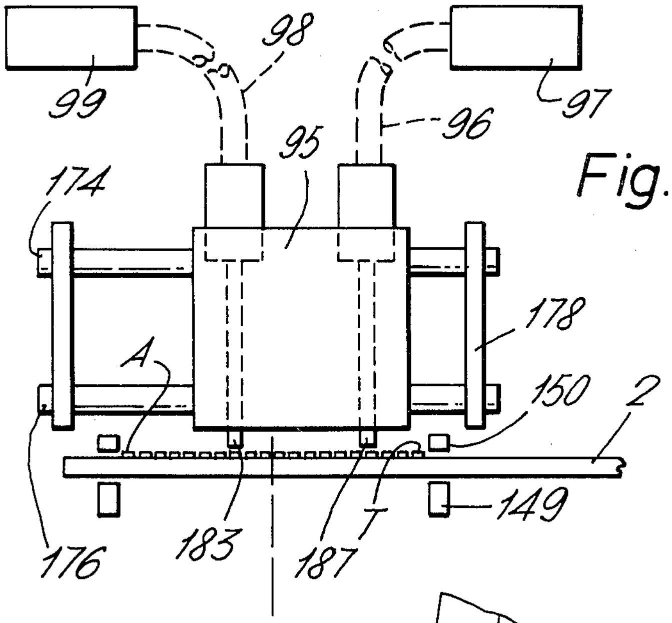
Fig.28.
Fig.29.
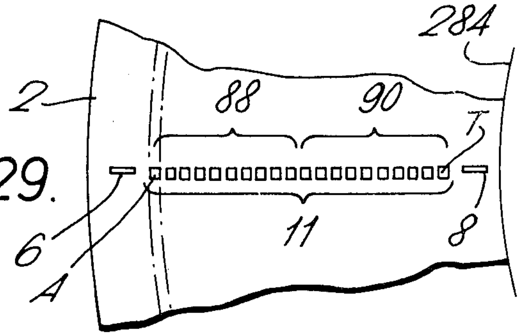

Fig.30.
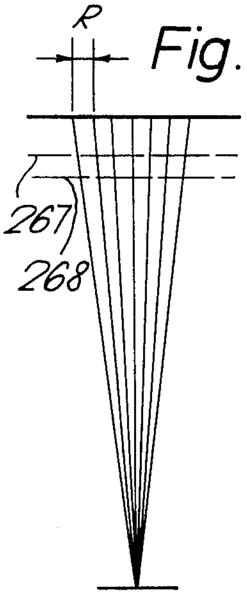
Fig.30a.
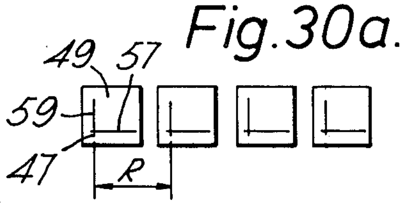
Fig.30b.
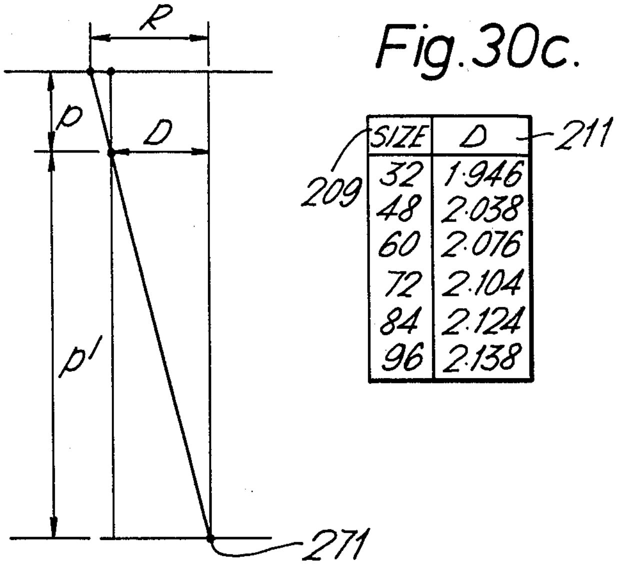
Fig.30c.
209 211
| SIZE | D |
|---|---|
| 32 | 1·946 |
| 48 | 2·038 |
| 60 | 2·076 |
| 72 | 2·104 |
| 84 | 2·124 |
| 96 | 2·138 |
Fig.31.
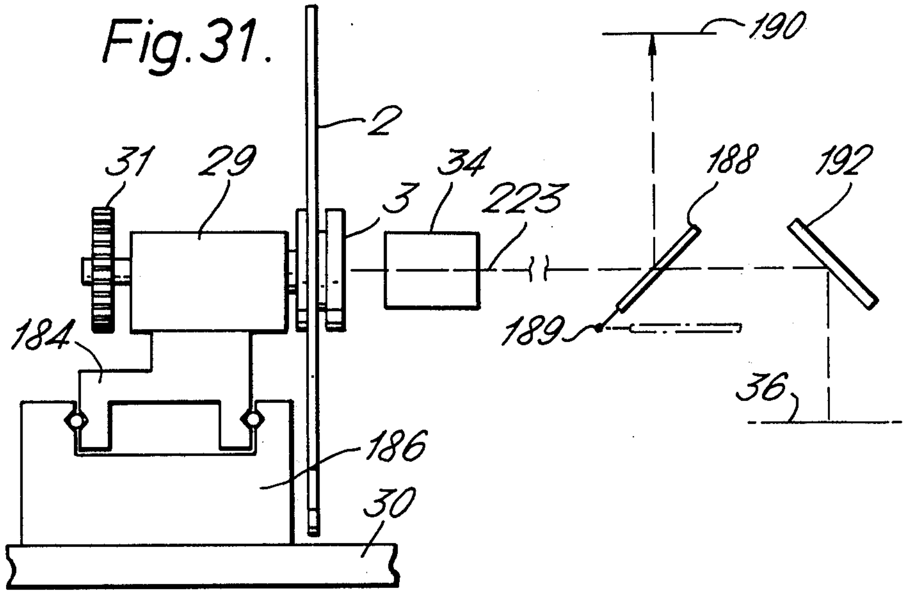

PHOTOGRAPHIC TYPE COMPOSING MACHINE

The present invention relates to photographic type composing machines and methods, and, more particularly, to means and methods for selecting, projecting and spacing, to form lines, ideographic characters selected from a relatively large number of different characters.

In certain languages using ideographic characters, such as in Chinese, Japanese, Korean and other Asian languages, type composition is greatly complicated by the fact that a relatively large number of different characters must be used. For example, in Chinese or Japanese, at least several thousand characters are required. This means that a relatively large character matrix, or several character matrices, must be used to store the characters. Also, because a single line or column of characters being composed may contain characters whose locations on the matrices are spaced from one another by relatively wide distances, type composition may require frequent relocation and/or reversale of direction by the character presentation or character spacing mechanism. For that and for other reasons the machine may be very slow.

Similar problems occur in composition using other alphabets if there are on the matrix a relatively large number of different type styles and the machine is capable of mixing the styles within a single line.

As a result of the foregoing and other problems, some prior devices for composition using ideographic characters necessitate the use of complex mechanical and/or optical devices to select and project the characters. These devices are generally expensive and/or slow.

It is an object of the present invention to provide a relatively simple, inexpensive and reliable photocomposing machine capable of rapidly selecting and positioning any of several thousand different characters located on a matrix. It is another object of the invention to provide such a machine with relatively inexpensive and automatic means to select different sizes for the characters and project them onto an image-receiving surface with proportional spacing.

The foregoing objects are met by the provision of a photocomposing machine and method in which a relatively large number of different characters or symbols is located in a plurality of rows on a moving matrix, preferably a rotating disc at a fixed location. The characters move in a direction which is perpendicular to the direction of the composition of a line. The spacing and projecting mechanism is moved in one direction only, that is, without reversing its direction for the composition of a line, and without translating the matrix, even though the line includes characters and/or symbols located in different rows. In order to accomplish this objective, the characters forming a line are not necessarily projected in the sequence in which they will finally appear in the composed line, but in a sequence which depends on the rows in which they are located and on the widths of the characters preceding or following the character to be projected.

Another feature of the invention permitting achievement of the foregoing objectives is the provision of a control circuit for a photocomposing machine in which a full line of characters is stored before the characters are projected, and in which the projection sequence is determined by the location of characters on a continuously rotating matrix. The displacement of the selecting and spacing mechanism is automatically adjusted for various point sizes of the characters.

The foregoing objectives also are met by the provision of a simple size-changing mechanism utilizing the same drive mechanism as the one used for character spacing.

Some prior art photocomposing devices have required a relatively large number of separate flash devices to illuminate characters. It is an object of the invention to minimize the number of flash devices required.

This objective is met by the provision of a carriage upon which one or two flash devices are mounted, and means for moving the carriage to bring the flash device to the position desired for illuminating a selected one of an array of characters on the character matrix.

It is the most prevalent current practice to use one photocomposing machine for composing newspaper text matter, and a separate machine for producing large-size characters for headlines or other uses requiring such large character sizes. It is another object of the invention to provide a single machine which is capable of composing text matter and, with minor modification, headlines too.

In the present invention, this objective is met by the provision of an attachment to the basic text machine which can be used for making headlines, without the need for a separate photocomposing machine.

It is a further object of the invention to provide a mechanism for introducing Pi characters at a minimum of expense.

This object is met by the provision of a Pi character mechanism which utilizes the same drive mechanism as that used to drive the flash lamp carriage.

In photocomposing machines using relatively large diameter character matrix discs, the discs can be very expensive because of the way in which they must be constructed in order to keep them from wobbling too much in the axial direction at the outer perimeter.

Accordingly, it is another object of the invention to provide a relatively low-cost character matrix disc of relatively large diameter. It also is an object to provide a lighter-weight, lower-cost matrix disc regardless of diameter.

The foregoing objects are met by the provision of a composite disc made of a light-weight, low cost photographic film disc, either integral or segmented, together with a central holder. The portion of the film which bears the characters extends beyond the holder. It is kept from wobbling too much either by normal air currents generated by spinning the disc, or by air jets formed by the use of compressed air applied to the film.

The cost of production of large discs also is high. It is an object of the invention to provide a relatively low-cost disc production method.

This objective is met by the projection of relatively small groups of characters rather than the larger groups normally projected, thus making two or more preliminary master discs, each containing a number of rows of characters, and forming a final master disc by successive contact printing of the preliminary masters.

In making a disc, the character location accuracy is important. Errors in location ordinarily are difficult to correct. In large discs, these problems are greatly magnified. Accordingly, it is a further object of the invention to avoid the cost and time required for such corrections.

In accordance with a further feature of the invention, character location errors on the disc are encoded into electrical signals, stored, and then read out of storage during use of the disc in type composition. The signals are used to modify the placement of the images on the film so as to correct the errors.

The foregoing and other objects and advantages of the invention will be set forth in or apparent from the following description and drawings:

In the drawings:

FIG. 1 is an elevation view of the character matrix disc of the invention;

FIG. 1A is an enlarged view of a section of the disc of FIG. 1;

FIG. 2 is a plan view of the photocomposing machine of the present invention;

FIG. 8 is a schematic representation of a line of symbols for horizontal reading;

FIG. 9 is a schematic representation of a line of symbols for vertical reading; that is, a column of symbols;

FIGS. 10 to 13 show Tables used to illustrate the operation of the machine of the invention;

FIG. 27 is a side elevation view, partially cross-sectional, of the device of FIG. 25;

FIG. 28 is a schematic representation of a modification of the flash unit of the invention;

FIG. 29 is a schematic view of a portion of the character matrix of FIG. 1;

Figure 32:
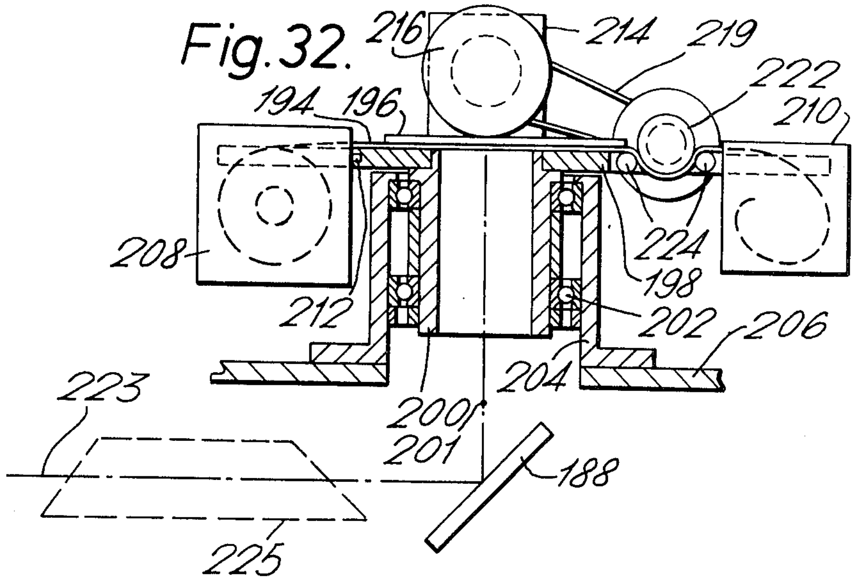
Figure 33:
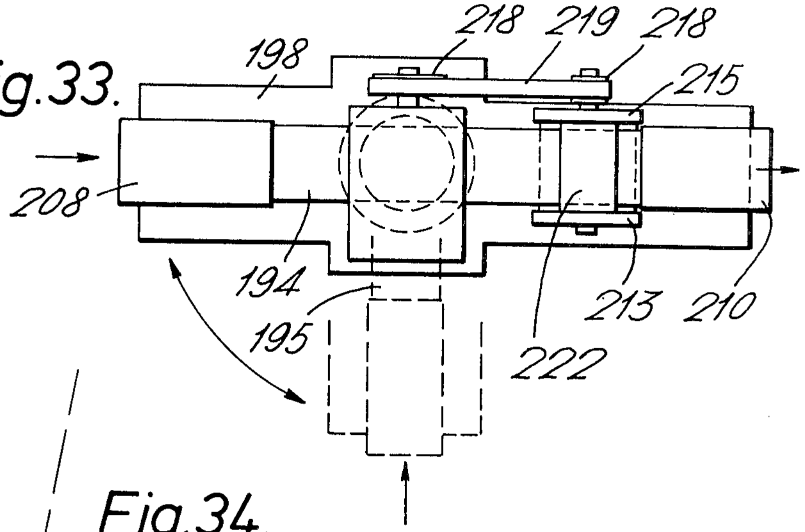
Figure 39:
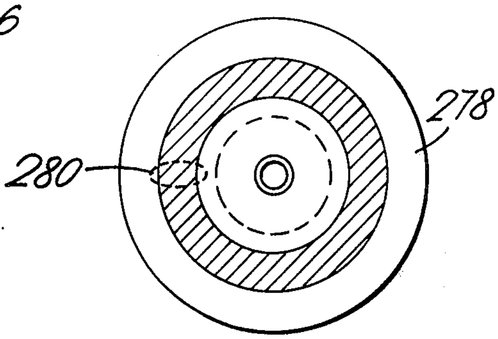
Figure 40:
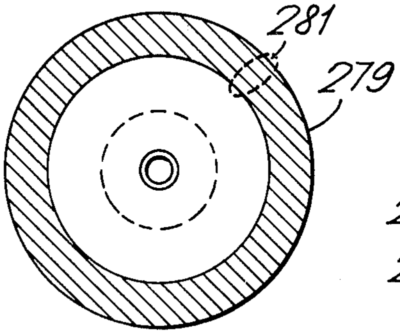
Figure 41:
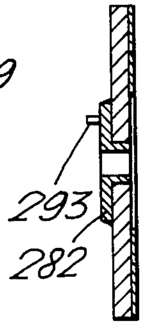
Figure 42:
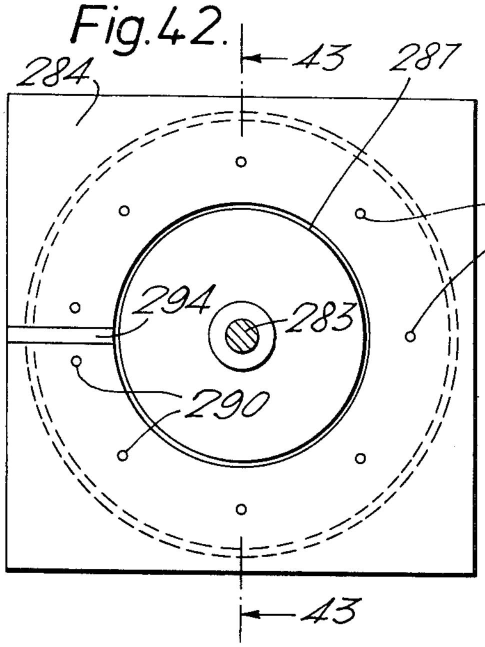
Figure 43:
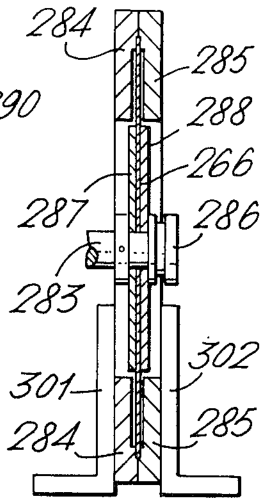
Figure 44:
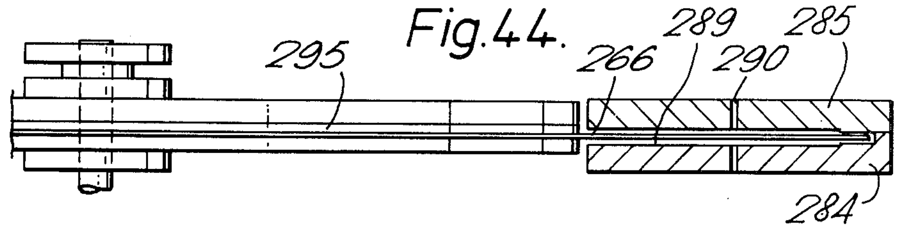
Figure 45:
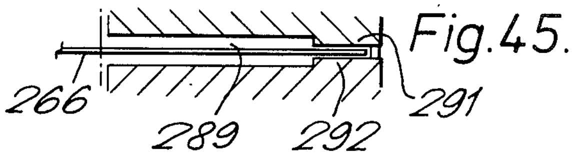
Figure 46:
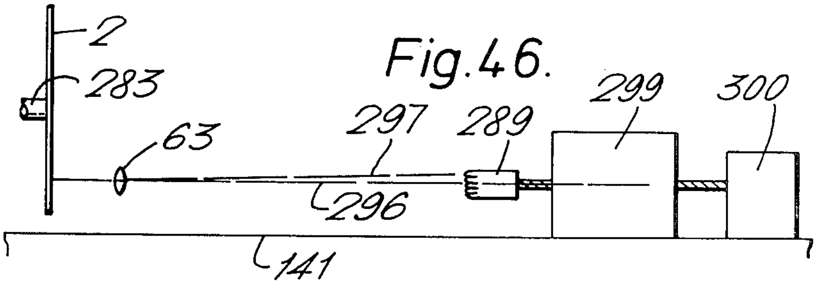

FIGS. 30, 30*a*, 30*b*, 30*c* and 31 are schematic representations of the relationships between matrix, lens position and film for the use of the invention in the production of headlines;

FIGS. 32 and 33 are simplified cross-sectional and plan views, respectively, of a head-lining attachment for the machine of the invention;

FIGS. 34 to 38 are schematic representations of the Pi character and ruling attachment for the machine;

FIGS. 39 to 41 illustrate a preferred method for the manufacture of master character matrix discs for use in the invention;

FIG. 42 is a partially schematic elevation view of the flexible disc feature of the invention;

FIG. 43 is a cross-sectional view taken along line 43—43 of FIG. 42;

FIG. 44 is an enlarged view of a portion of FIG. 43, rotated by 90° from that of FIG. 43; and FIG. 45 is a further enlargement like FIG. 44; and FIG. 46 illustrates a preferred means to introduce electronic corrections into the control circuit of the machine.

GENERAL DESCRIPTION

The general arrangement of the photocomposing machine of the invention is shown in FIG. 2. In this embodiment of this invention, the characters are arranged in concentric circles on a continuously rotating matrix, preferably in the form of a disc 2. The characters are transparent on an opaque background. The disc 2 is removably attached by a knob 3 to a spindle contained in a hub 39, mounted on a base plate 30. The spindle is rotated continuously by a motor and belt (not shown) which drive a pulley 31. The character rows are shown schematically at 4. The illuminating system, which will be described in greater detail in relation to FIGS. 24 to 27, includes a flash head 142 from which a flash of light of extremely short duration is directed by way of a fiber-optics light pipe 126 to a movable illuminating unit 108 which can be positioned to illuminate any selected row of characters on the disc by sliding along rails 176 mounted in brackets 178 and 180.

The base plate 30 of the machine supports a lens carriage assembly 21 including end brackets 24 supporting rails 22 and 23. A lens-holding carriage 12 is mounted so as to slide on the rails 22 and 23 when driven by a reversible stepping motor 16 which drivably engages a rack 14 which is attached to the lens carriage 12. The carriage 12 preferably holds more than one lens to enable the machine to project characters of more than one size on the film without manual intervention. In the embodiment shown in FIG. 2, the carriage 12 is provided with two lenses 32 and 34. A sheet of photographic film is shown at 36. The film is stationary during the composition of a line. The lenses 32 and 34 are of different focal lengths and are located so as to form sharp images at the plane of the film 36.

CHARACTER MATRIX DISC

The disc 2 shown in FIG. 1 is composed of a group of twenty concentric circles or rows of characters. There are up to 256 characters per row, for characters of five point size, giving the total character capacity per disc of 5,120 different characters. Each row is identified by one of the letters A to T, from the outermost row to the innermost row. Only the letters A and T are shown in FIG. 1. As it originally was described in U.S. Pat. No. 2,790,362 and now is well known in the art, there are located on a circle 7 a number of transparent radial slits, or timing marks, 7*a*, one per character. A wider slit such as 6 is provided to detect the origin of a disc cycle. As explained later, the disc 2 and especially a composite disc, can advantageously bear additional slits on circle 9, with a wide slit 8. The disc can be produced from a photographic plate or can be a disc of film rotating freely or confined against one or two transparent discs covering either the entirety or only the central section of the disc. The disc can also be made up of individual segments.

OPERATION

Figure 3:
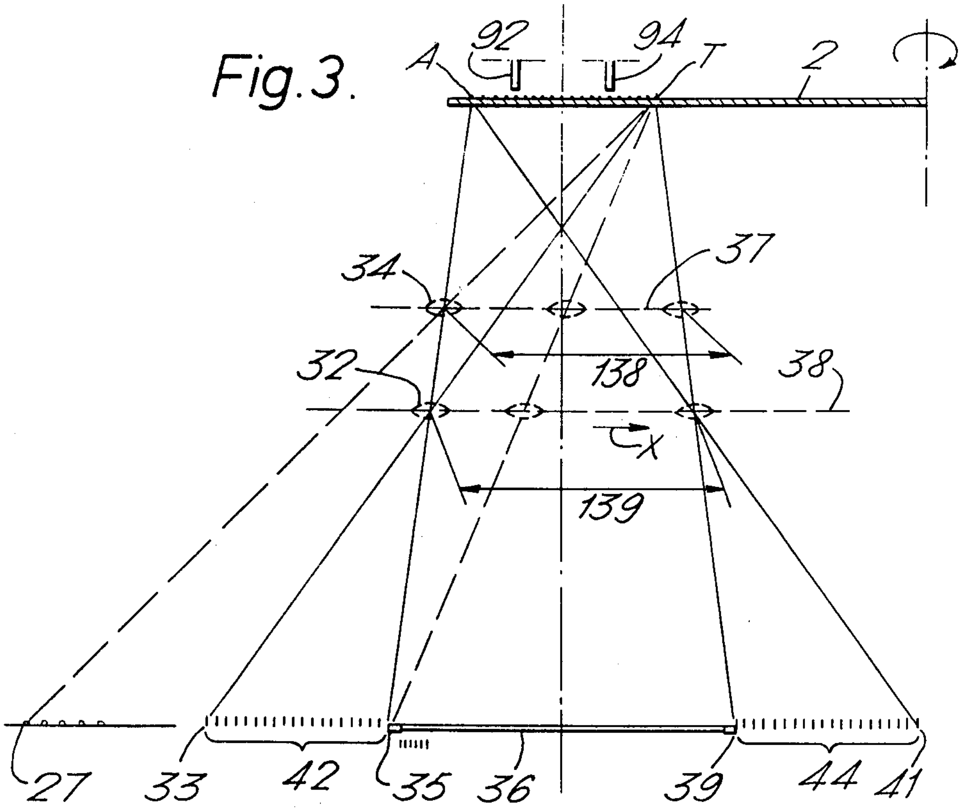
FIG. 3 is a schematic diagram illustrating the use of the invention in the formation of lines of characters of different sizes.

The mode of operation of the machine of FIG. 2 will be explained in conjunction with FIG. 3. In FIG. 3, half of the disc 2 is shown in cross-section, with the character rows represented as dots such as A and T. Movable light pipes are shown schematically at 92 and 94 for illuminating characters on the disc. For the description of the operation of the machine, it will be assumed that any character row can be selectively illuminated on command. The two lenses 32 and 34 are shown producing two different magnifications, each lens being located at the proper distance to focus characters on the film 36.

Let us assume that the lens 32 is in use. The location of this lens, for the composition of a line from left to right, is as shown. It is assumed for easier description that the lens 32 produces images of the same size as the characters of the matrix disc. Thus, line 38, which represents the track followed by lens 32 as it moves to select and space characters, is located halfway between the matrix and the film.

It is assumed in the example of FIG. 3, that the line to be produced starts at point 35 and ends at point 39, and that lens 32 moves in the direction of the arrow X. This motion is in steps of various values, but always in the same direction during the composition of the entire line. Neither the lens, nor the film, nor the disc have to be moved to cover all the rows of the matrix disc. This result is achieved by combining two independent numbers to represent each character. The first number is representative of the row of the selected character. It is referred to, in this description as "row value". The other number represents the length of the portion of line preceding (or following, depending on the mode of composition) the character to be projected. It is referred to as the "accumulated width value". The sum of the two numbers determines the location, along its travel, of the lens 32 at the time it should stop and wait for the selected character on the disc 2 to reach the projection position, which is a line 11 in FIGS. 1 and 9. This sum is referred to as the "displacement value". All of the numbers are conveniently represented in relative width units, for example one-seventh of a one-point Em.

In the embodiment of FIGS. 2 and 3, lens 32 as well as lens 34 giving a two-to-one enlargement are located as shown to project any character contained in row A of the matrix at the beginning point 35 of the line to project. If the first character of the line is located on row T, the location of the lenses would be as shown, at the intersection of track 37 for lens 34 and track 38 for lens 32 with line T-35. The production of a full line containing characters of every row would necessitate a displacement shown as 139 for lens 32 and as 138 for lens 34. It can be understood that between these two extreme positions of a lens it will be at positions which will allow characters located on any row (A to T) to be projected within the line. As can be seen on the figure, the potential image of all the character rows falls outside the left hand margin of the film at 42, between point 33, representing the location of row T when lens 32 is at its extreme left travel, and point 35. In the same way, at its "zero" position, lens 34 projects the image of A-T between points 27 and 35. As lens 32 moves along line 38 in the direction of the arrow X, the characters of different rows will successively have their potential image at point 35. For a one to one magnification, each time lens 32 moves a distance equal to one half the distance between two consecutive rows on the matrix, the characters contained in a new row will be projected at point 35, that is, at the beginning of a line. The same applies to lens 34, except that, to replace the projection of one row at a point on the film by the projection of an adjacent row, the lens will move by a longer distance proportional to the enlargement ratio, which, in this case is two to one. The relationship between the movements of the lens and the enlargement ratio will be explained later.

As lens 32 moves from its left hand "zero" position shown in full lines to the position shown in dashed lines at the intersection of line 38 and line T-39 connecting the innermost row of characters to the right hand margin 39 of the line, the image of all the rows gradually moves from position 33 to position 41. Thus, any character contained in any row can be projected to its allocated position in the line during the lens travel, provided the lens stops momentarily at pre-selected positions to wait for the selected character to cross the projection area. In general, the distance traveled by the lens to compose a full line will be less than its maximum travel, because the most frequently used characters will be located in adjacent rows in order to speed up the process.

It will also be understood that the lens motion is used to properly space the characters of the line. This is achieved, as stated above, by the same mechanism as the row selecting mechanism. For example, it is clear that as lens 32 moves from position zero to a position shown in dotted lines at the intersection of line 38 and line A-39, any character of row A can be projected at any location on the line. The proper spacing is achieved by taking into account the enlargement ratio and the width of the characters. As the lens is stepped along line 38 (in the direction of arrow X) characters are flashed, filling the line gradually, but not necessarily in the sequence in which the characters appear in the composed line.

As it can be understood by examination of FIG. 3, the displacement of the higher magnification lens 34 will not be the same as the displacment of lens 32 to reach the same point of the film.

Figure 4:
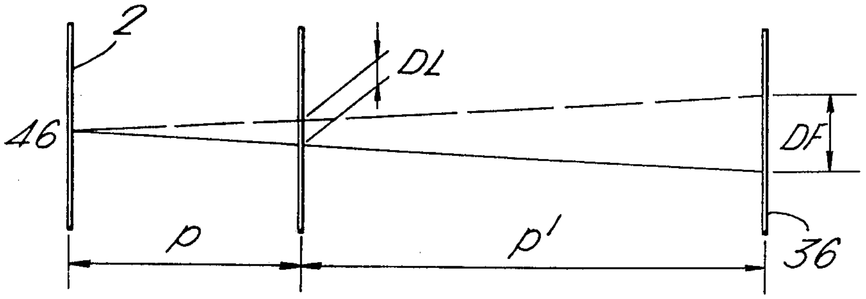
FIG. 4 is a schematic diagram illustrating the relationship between the disc, lens and film for character spacing in the invention.

The relationship between lens motion and the character image positioning on the film will be explained in conjunction with FIG. 4. In this figure, the matrix disc is shown at 2 and a character of the disc at point 46. The distance from the character (object) to the lens is P and the distance from the lens to the film in plane 36 (image) is P'. The displacement DL of the lens to move the character image by a distance DF on the film is given by the following equation: $DF/DL = (p + p')/p = 1 + p'/p = 1 +$ Magnification "M". Thus, DL is given by the following equation:

$$DL = DF/1+M \qquad (1)$$

Assuming that the disc carries five-point characters, for images of point size S, equation (1) becomes:

$$DL = \frac{DF}{1 + \frac{S}{5}} \qquad (2)$$

which can be simplified to:

$$DL = \frac{5DF}{5 + S} \qquad (3)$$

It is desired to compute the value of lens displacement DL needed to move a character image of a given size "S" by a distance of one relative unit on the film. As it has been stated above, a relative unit of one-seventh of one point Em has been selected for use. A one-point Em is 0.35mm, which is also one typographical point. Therefore, one-seventh of an Em is 0.05mm, and DF is 0.05S. Substituting this value of DF into equation (3), we obtain:

$$DL = \frac{.25\,S}{5 + S} \tag{4}$$

Equation (4) gives the value of the lens motion needed to displace a character image of a size S by one relative unit on the film. The values of DL can be precomputed and stored in a "look-up table" (memory) and used to instruct the lens carriage to move the proper distance to position characters of a given size in the line. The different values of DL for selected point sizes are given in the table of FIG. 13. The values of DL are in microns.

EXAMPLE

In order to illustrate the operation of the machine an example will be given in conjunction with FIGS. 8 through 13. It is assumed, in this example, that each of the characters on the matrix disc has a height and maximum width of 5 points, that is, 0.35 times 5 = 1.75 mm (5-point Em). The width increment of the characters has a value of one-seventh of an Em. This increment on the disc will be equal to 0.25 mm. The character rows preferably are spaced from one another by a distance larger than the width of the widest character. It is assumed here that the row spacing is 9 relative units, which corresponds to 2.25 mm, thus leaving a minimum clearance between characters of different rows of 2.25–1.75–0.5 mm, a spacing which has been found quite acceptable in practice.

With the rows spaced 9 units apart, assuming that the first actual row is the outside row A, and also assuming that row A is located at a distance of 9 units from a theoretical outside row which is used as a starting point, the "row value" for consecutive rows will be 9 for row A, 18 for row B, etc. The different row values are shown in the table of FIG. 10.

FIG. 8 represents a line of ideographic symbols or characters. The capital letter in each box in FIG. 8 identifies the row in which the character is located. The number in each box represents the distance of each character from the origin mark 6 or 8 (FIG. 1) in its row. The number is equal to the number of photoelectric pulses which must be counted before the desired character is ready to be flashed.

In order to simplify the description, it is assumed that all of the characters are of the same width and are spaced equally by a distance S (FIG. 8), for example, seven relative units. The character location letter and number, and the "row value" if each character of the line to be composed are shown, respectively, in the first two columns of FIG. 11. The third column of FIG. 11 represents the "accumulated width value" of the characters of the line, starting at zero for the first character and increasing 7 units for each succeeding character of the line. The addition of the numbers of the second and third columns gives the "displacement value" shown in the fourth column. Each number in the fourth column represents the distance the lens should travel from a starting point before it is in the proper position to project the selected character at the selected position in the line.

In order to be able to compose a line of characters while moving the lens in only one direction, thus maximizing the speed of operation, the characters are not flashed in the sequence in which they appear in the line, but in the sequence shown in FIG. 12. In this figure, the character locations (which are representative of characters) are shown in the first column, and the "displacement values" in the second column. The characters are listed in the order in which they will be projected. As the lens moves, certain characters will be flashed "early" and others "late" in relation to their position in the line. For example, by the time that the lens has traveled 107 units (see line 43 in FIG. 12), the characters represented by the shaded boxes in FIG. 8 have been projected, but the others have not. This leaves "holes" for characters to be projected later. For example, the second character (0–180) of the line has not yet been flashed, even though the last character of the line (A-12) has already been flashed.

The projection of a full line can occur when the lens moves in the "forward" direction as shown by arrow 100, and/or in the "reverse" direction as shown by arrow 101.

In addition, the matrix disc 2 can contain characters or symbols rotated by 90° from the horizontal orientation shown in FIG. 8 in order to produce columns of characters or symbols, across the film sheet 36 as indicated schematically in FIG. 9. This can be especially useful in composing Chinese and other ideographs, and in tabular work.

Figure 14:
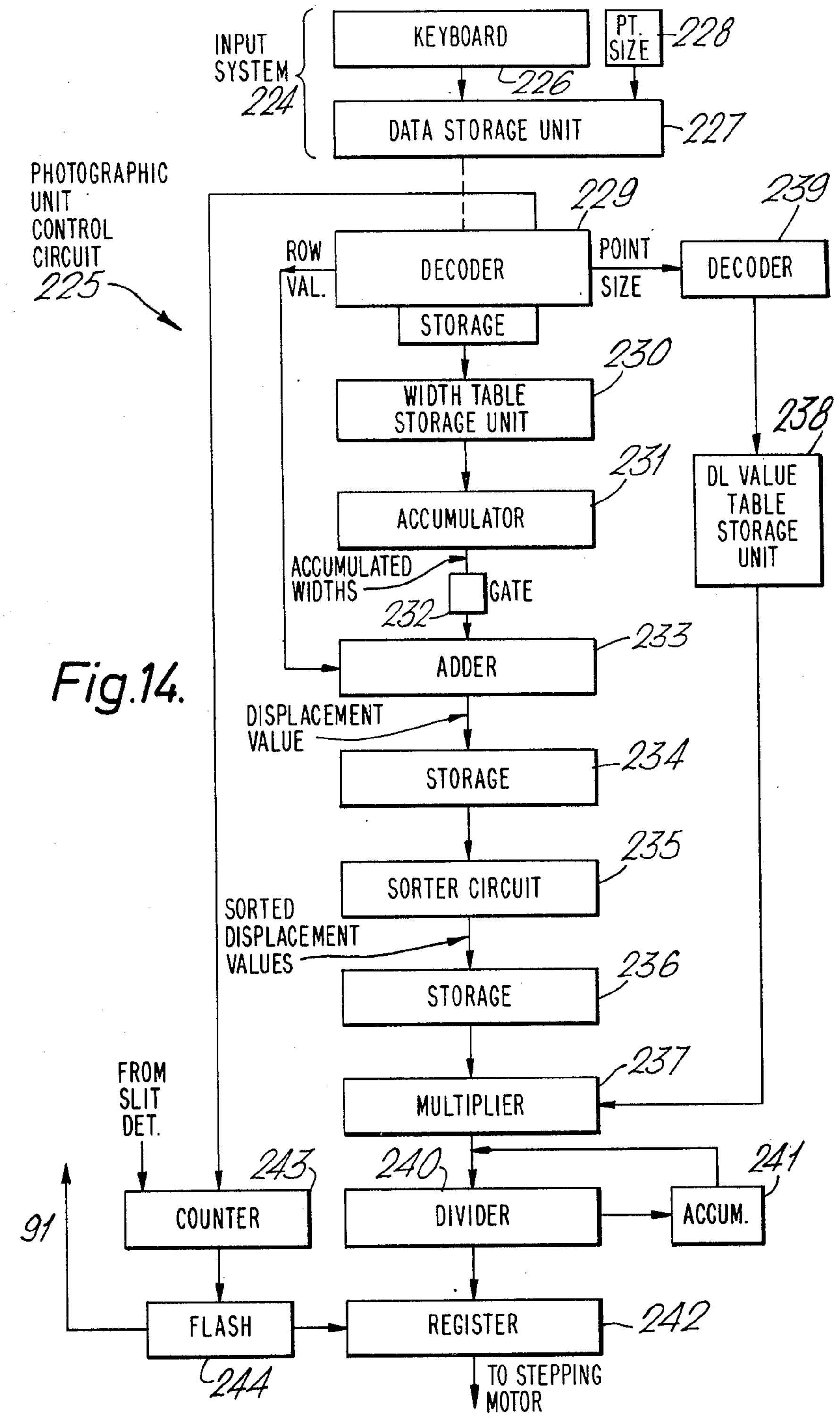
FIG. 14 is a block diagram of the major elements of the electronic control circuit of the machine.

FIG. 14 is a combination circuit block diagram and flow chart showing the sequence of operations used in the machine to produce lines of characters. FIG. 14 shows an input system 224 and a photographic unit 225.

The input system 224 includes a keyboard 226 which is operated to produce identification codes for each character, and a point size selector 228 which produces distinct codes for each point size. The keyboard and size selector feed their information to a data storage unit 227. The unit 227 can be a simple buffer, if the machine is to be operated directly by the keyboard, or the storage unit 227 can be a magnetic or paper tape recorder, or magnetic disc, or any other suitable form of data storage device.

To operate the photographic unit 225, the information pertaining to each character is fed to a decoder-storage unit 229. The identify of each character is determined by the row identification letter and location number (as shown in the example of FIG. 8). This information is decoded and stored temporarily in unit 229, and then is sent to a width storage unit or "table" 230 where, if necessary, different width values are assigned to each character. The widths of the characters from the width table 230 are accumulated in an accumulator 231 which, at any instant, represents the "accumulated widths" of the characters transferred from storage. The accumulated widths value is transferred through a gate 232 to the adder 233 where the "row value" of each character is sequentially added to the "accumulated widths". The resulting "displacement value" is sent to storage unit 234, and then to a sorter circuit 235 which classifies the displacement values according to their increasing (or decreasing) value, to produce the flash sequence as shown in the first column of FIG. 12. The third column of FIG. 12 represents, in relative units, "C", the lens carriage motion between consecutive flashes. The sorted displacement values are stored in a storage unit 236 in the order in which they will be flashed.

The information pertaining to the point size in use is fed through a decoder circuit 239 to a storage unit known as a "look-up" table 238 which corresponds to the table of FIG. 13. The signals representing DL values emerging from this table are not changed except when the point size changes; that is, when a new lens is put to use. The signals are sent to a multiplier circuit 237 which multiplies the "displacement value" by the DL value which, of course, is a function of the size of projected characters.

It is convenient to chose as one increment of the lens displacement a value as small as possible for maximum accuracy and large enough to reduce the number of steps if a stepping motor is used to move the lens carriage. The value of one step has been chosen equal to 0.04 mm. The signals from the multiplier 237 are divided by the incremental step value by means of a divider circuit 240. The division is made at this point rather than before the accumulated widths is determined in order to minimize the theoretical spacing errors due to the fact that we assume that the carriage driving mechanism can handle only exact increments. The various displacements D of the lens carriage are listed in the fourth column of FIG. 12 in the form of relative units of 10 point characters.

In the example now being described it is assumed that lens 34, giving a two to one magnification, is being utilized to produce on the film characters of 10 point size from the five-point characters on the matrix 2. The fifth column of the same Figure rerpesents E, the incremental number of steps the carriage is moved between the projection of characters. The divider 240 produces the number of steps the lens has to be moved from the beginning of the line, and register (counter) 242 causes the lens carriage to be moved by a distance, expressed in steps, equal to the new number entered into the divider 240 minus the previous number. In other words, unit 242 feeds into the stepping mechanism the number of pulses needed to keep up with the increasing displacement values of the second column of FIG. 12. As the division generally produces a small remainder, it can be dropped as insignificant, or accumulated in an accumulator and used to make an occasional correction.

The sequence number representing each character is transferred from the character decoder and storage unit 229 to a counter circuit 243 which receives pulsess from a slit detector which generates one pulse for each slit on the spinning disc 2, as is well known. When the number of slit pulses counted is equal to the character sequence number, a flash circuit 244 is energized and a signal is sent to the spacing controls and, through lead 91 to a conventional sequencing circuit (not shown) which will cause the processing of the next character stored in unit 236.

LENS CARRIAGE

Figure 5:
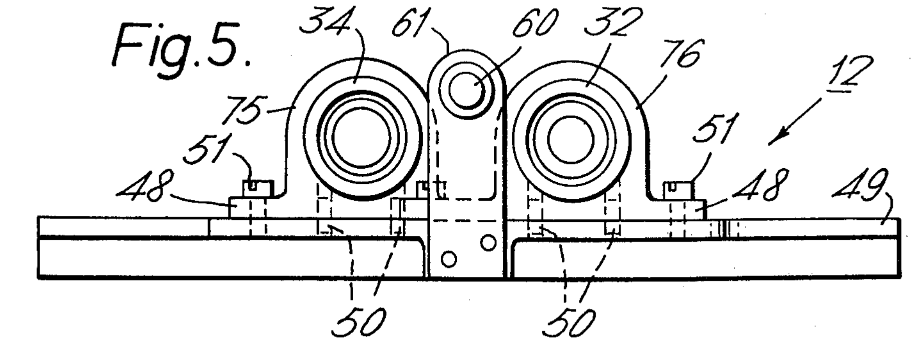
FIG. 5 is a side elevation view of the lens carriage of the device shown in FIG. 2.
Figure 6:
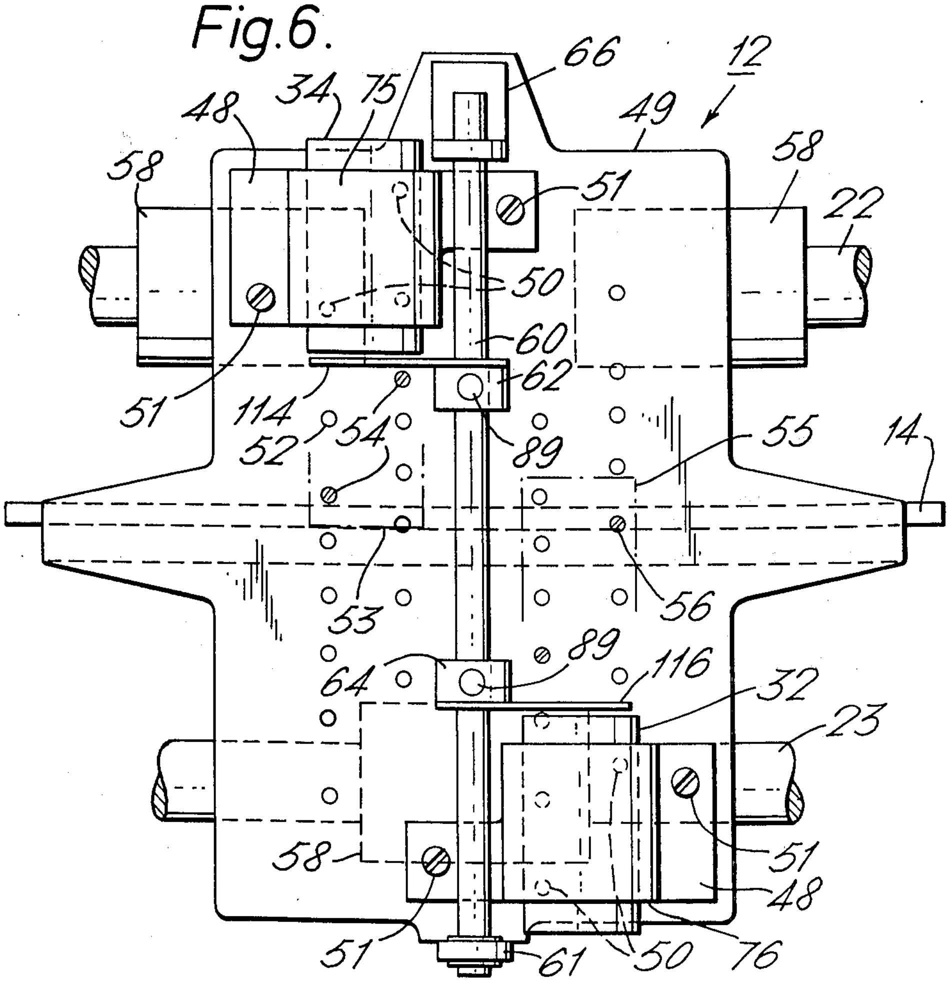
FIG. 6 is a plan view of the carriage of FIG. 5.
Figure 7:
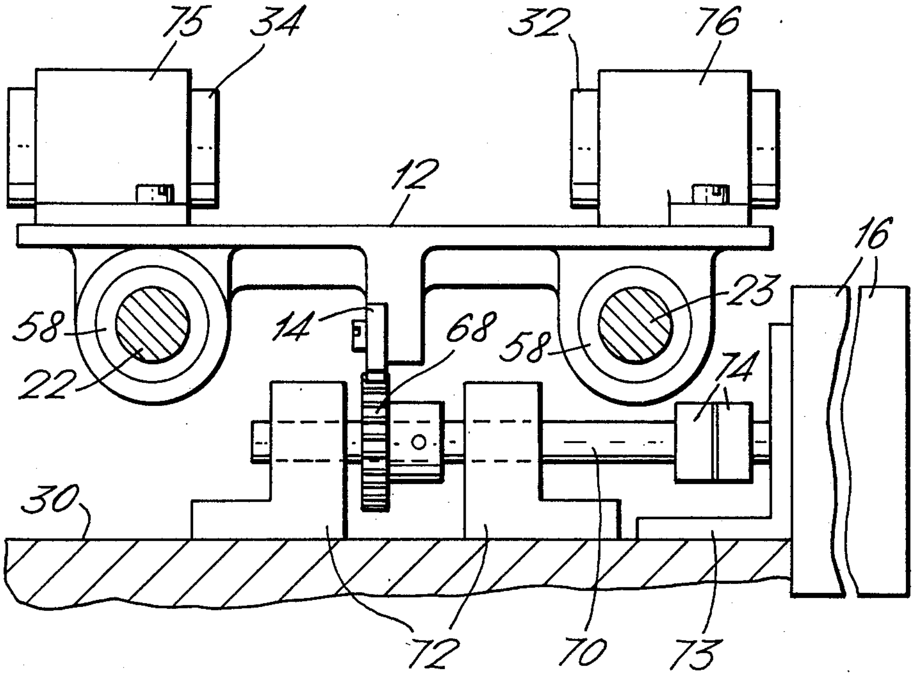
FIG. 7 is a cross-sectional view taken along line 7—7 of FIG. 2.

FIGS. 5, 6 and 7 show the lens carriage 12 of FIG. 3 in detail. The carriage includes a base plate 49 and the two lenses 32 and 34 mounted on the base plate. Each lens is mounted in a support block 75 or 76 comprising a base 48 and a tubular housing in to which the barrel of the lens fits. The support blocks 75 and 76 are accurately positioned on the base plate 49 by positioning pins 50 (see FIGS. 5 and 6) engaging accurately located holes 52 in the base plate 49. Each block 75 and 76 is attached to the base plate by two screws 51 passing through holes in opposite flanges of the bases 48 of the support blocks 75 and 76. Tapped holes (not shown) are provided in the base plate to receive the screws 51 at a plurality of locations and thus mount the lens blocks at the different locations determined by the pin holes 52.

The lenses 32 and 34 can be selected to provide any two different point sizes, within the size range of the composing machine, e.g. from 5 to 36 points. In order to accommodate the longer lens barrels of such other lenses, additional holes 56 are provided in the base plate 49 to receive the locating pins 50 of the support block for the longer lens barrel. In the same fashion, additional holes 54 are provided for locating a longer lens barrel in place of lens 34. The positions of the ends of such longer lens barrels are shown in dashed outline 55 and 53.

FIG. 7 shows the drive system for the lens carriage. The drive system includes a stepping or servo motor 16 which is attached to the base plate 30 of the composing machine by means of a bracket 73. A coupling 74 connects the output shaft of the motor 16 to a drive shaft 70 mounted on base plate 30 by means of bearings 72. A pinion 68 is pinned to the shaft 70 and mates with the rack 14 which is attached to the underside of the lens carriage 12. The lens carriage is secured to three bearings 58 (see FIG. 6 as well as FIG. 7) which guide the carriage 12 smoothly and with low friction along the rails 22 and 23 to space and select characters for projection.

LENS SELECTION

Figure 15:
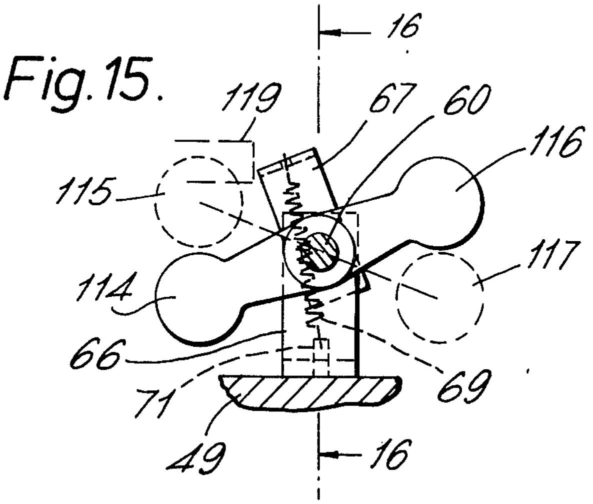
FIGS. 15 and 16 are schematic representations of a toggle mechanism used for lens or shutter selection in the machine of the invention.
Figure 16:
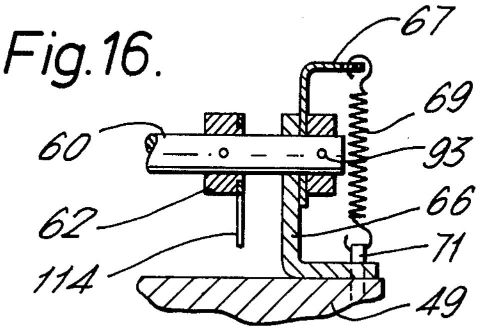

The selection of one or the other of the lens can be achieved in the manner to be described with reference to FIGS. 5, 6, 15 and 16. A shaft 60 is rotatably supported on the lens carriage base plate 49 by brackets 61 and 66. Two shutters 114 and 116 are fastened to the shaft 60 by means of hubs 62 and 64 and set screws 89. Referring to FIGS. 15 and 16, the shutter blades 114 and 116 are operated by a toggle mechanism (not shown in FIG. 6) comprising a lever 67 mounted on a hub attached to one end of shaft 60 by a screw 93 (FIG. 16). A spring 69 is attached as shown to the end of lever 67 and to a pin 71 mounted on the lens carriage base plate 49. This toggle mechanism makes it possible to move one or the other of the shutter blades 114 or 116 into the optical path of one or the other of the lenses. For example, in the solid-line position of FIG. 15, the shutter blade 114 occludes lens 34 and shutter blade 116 of hub 64 is out of the way of lens 32, allowing only the characters produced by lens 32 to pass through. Rotation of the shutter blades is stopped by screws mounted on the carriage and not shown in the drawings.

Referring to FIG. 2, two stops 119 and 121 are mounted at fixed, predetermined locations on the support brackets 24 for the purpose of activating the toggle mechanism whenever a point size change is to be made automatically. For this purpose, the code corresponding to a lens shift causes the carriage to move beyond the extreme right or left hand margin of the line. If, for example, it is desired to use lens 34 instead of lens 32, then carriage is moved to the left until, as shown in FIG. 15, the upper portion of the lever 67 hits the stop 119. This causes the toggle to snap to its other position so that the shutter blade 116 moves down to position 117 and the shutter blade 114 to position 115, thus covering lens 32 and uncovering lens 34.

Figure 17:
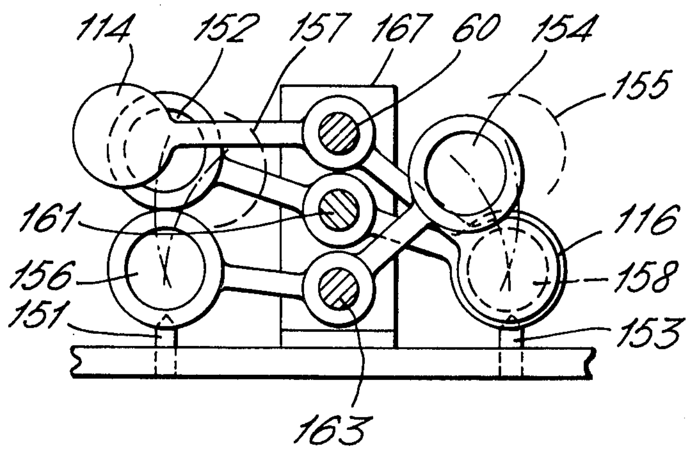
FIGS. 17 to 19 are simplified representations of the mechanism mounted on the lens carriage to select one of four lenses.
Figure 18:
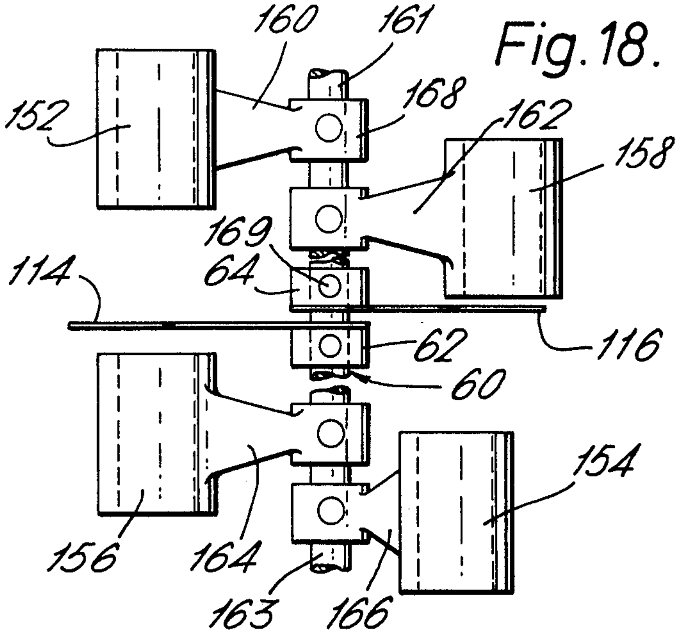
Figure 19:
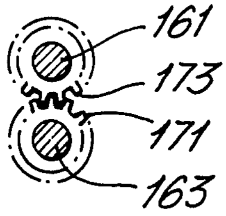

A system in which four different lenses can be mounted at one time on the lens carriage is shown in FIGS. 17, 18 and 19.

This shutter mechanism is similar to the one described above, and the same reference numerals will be used for corresponding parts. The shutter blades 114 and 116 are attached to hubs 62 and 64 which are secured to the shaft 60 by set screws 169 and can be positioned at any preselected location on shaft 60. Shafts 161 and 163 (FIGS. 17 and 19) are parallel to shaft 60 and are supported by the same end brackets, e.g. bracket 167, as shaft 60. A pair of lens holders 160 and 162 (FIG. 18) is attached to the shaft 161 and another pair 164 and 166 to shaft 163. Lenses 152, 158, 154 and 156 are attached to lens holders 160, 162, 166 and 164, respectively.

Lens 152 and 158 constitute the first pair of lenses and lenses 154 and 156 the second pair. Only one of each pair of lenses can be in operative position, that is, in condition to transfer the bundle of rays forming a character image to the film. For example, in the arrangement of FIG. 17, lens 156 of the second pair of lenses is in operative position and lens 154 of the same pair is in the inoperative position. As can be seen in FIG. 17, lenses 156 and 154 are not in line with their shaft 163, but are offset so that when one lens is brought down into the path of the character forming rays of light, the other is moved up. Shaft 163 is provided with a toggle mechanism similar to the one described in relation to FIGS. 15 and 16, so that one or the other of the two lenses can be snapped into operative position by the displacement of the lens carriage in one or the other directions until the toggle lever 65 (FIG. 20) of shaft 163, which is similar to lever 67 described above, hits either stop 123 or stop 125. The selected lens is located precisely on the carriage by preadjusted screws 151 and 153 (FIG. 17) so that it can be brought to the exact location to project characters on the same base line regardless of the magnification ratio.

As shown in FIG. 19, shaft 163 is provided with a pinion 171 engaging a mating pinion 173 of the same diameter secured to shaft 161. Shaft 161 is provided with another pair of lenses 152 and 158 of different focal lengths which are mounted in holders 160 and 162. It is clear at this point that a clockwise rotation of shaft 163, which will bring lens 154 into operative position and remove lens 156 from this position, will result in a counter-clockwise rotation of shaft 163, which will result in the replacement of lens 156 by lens 152 at the same time as lens 158 will move up, beyond the area of the character-forming light rays. Thus, by selective energization of the toggle mechanism mounted on shaft 163, it is possible to bring two of four lenses into operative position. One of these two lenses is selected by the operation of the shutter mechanism.

In the embodiment shown in FIG. 17, both lens 156 of the first pair and lens 158 of the second pair could project characters. But the location of shutter blade 116 in the path of the light rays striking lens 158 disables this lens so that lens 156 along will project characters.

Figure 20:
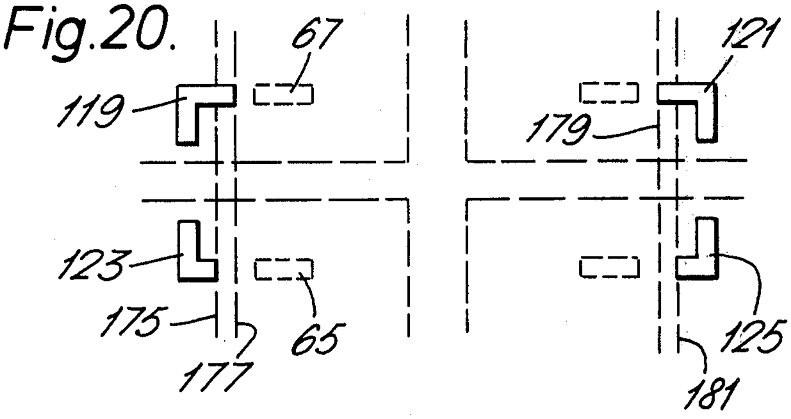
FIGS. 20 through 22 represent a line of symbols composed using symbols of different sizes.

To summarize the operation of the four-lens selecting system, two of four lenses are selected by one mechanism, and one of the two lenses is selected by another mechanism. In FIG. 20, the shutter toggle mechanism stops are shown at 119 and 121 and the lens toggle mechanism stops are shown at 123 and 125. The toggle trip lever is shown at 67 for the shutter mechanism and at 65 for the lens mechanism. The stops 119 and 121 extend toward the center of FIG. 20 farther than stops 123 and 125 so that if the lens carriage is moved to line 175, both tripping levers 65 and 67 will be moved (if not already in position) so that, for example, the shutter mechanism will be in position "one". If the carriage does not move to the left beyond line 177, a line at the right edge of stop 119, only the shutter mechanism will be activated by stop 119 so that, at this point, the shutter will be in position "one" and the lenses will remain unchanged in either position "one" or "two". When the carriage is moved to the right, to line 179, a line at the left edge of the stop 121, the shutter mechanism will be moved to position two and the lenses will remain in either position "one" or "two". A further displacement to the right of the carriage, to line 181, will force both the lenses and the shutter to move to position two.

In an alternative to the system using fixed stops as in FIG. 20, variably positionable stops can be used. For example, two solenoid-operated stops can be used in place of the fixed stops. Each such stop would be movable by solenoid action between a position on line 175, and another line on line 177.

Thus, it can be seen that by controlling the motion of the carriage beyond the left hand or right hand margin of a line, any one of the four lenses can be enabled while the others are disabled. For example, if we assume that FIG. 17 shows the shutter in position "one" and the lenses in position "two", and it is desired to reverse the arrangement so that the shutter will be in position two (with blade 114 down and blade 116 up), the carriage will be moved to the left to line 175 which will cause the lenses to go from position "two" to position "one". Thus the carriage will be moved to the right to line 121 which will cause the shutter to move from position "one" to position "two". At the end of this operation, lens 154 will project characters rather than lens 156.

Since the lenses are located a certain distance from one another, a correction is required in the positioning of the carriage such that the desired lens is brought on a line such as A-35 or T-39 (FIG. 2) before characters are actually flashed. This is achieved, following each point size change, by positioning the lens carriage at a pre-determined location from its zero position, as represented by the dashed line 18 in FIG. 2. The correction value, expressed in terms of the number of carriage steps from zero, can be stored in a table. The zero position 18 can be established by the use of a stop member or the activation of a limit switch by the carriage when it reaches a position to stop at.

SIZE MIXING

Figure 21:
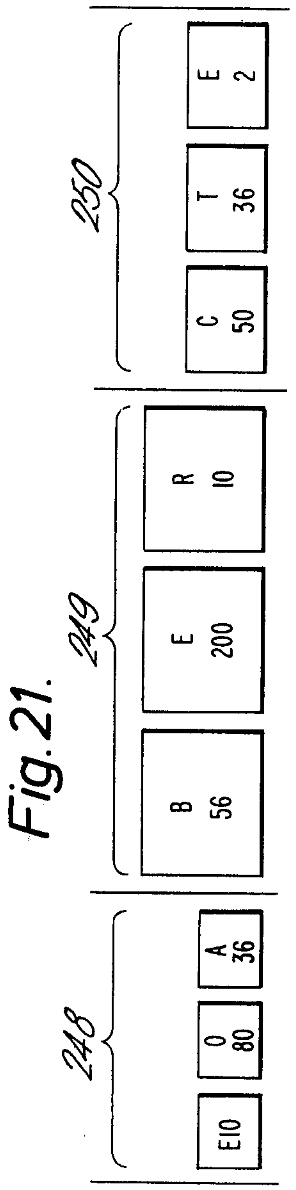

It is possible, with the system described above, to mix different sizes in the same line, as shown in FIG. 21. In FIG. 21, three character groups 248, 249 and 250 are shown, all of different sizes. Characters in the first group 248 have size "1", the second group 249 has size "2", and the last group 250 has size "3".

Figure 22:
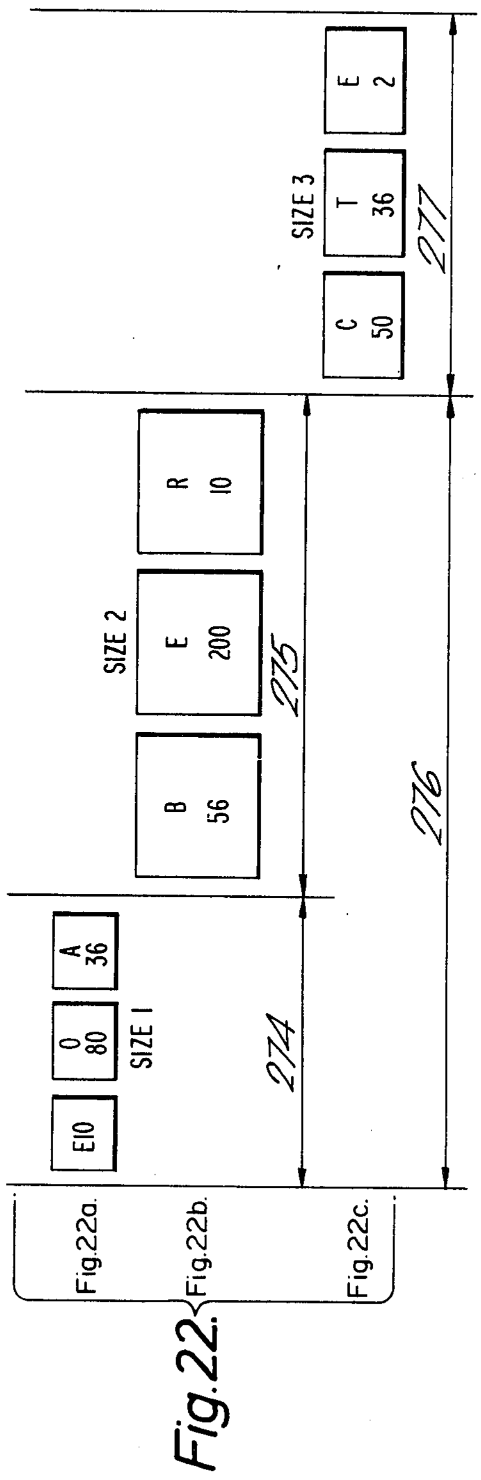

Although the machine can be operated differently to achieve the desired result, it will be assumed for ease of description that the line of FIG. 21 is produced in three different passes of the lens carriage, always in the same direction. The first pass, with lens of size "1" in operative position will produce the first character group 248, as shown in FIG. 22a. The second pass, with the lens for size "2" in operative position, will produce characters of the second group 249 (See FIG. 22b) and the third passage with the lens for size "3" in operative position, will produce characters of the last group 250.

In the first step of composing the line, the first group 248 will be produced, and the lens carriage will be moved beyond its "zero" position in order to create a shift from the lens for size 1 to the lens for size 2, in the manner explained above. Then the carriage will move back to its lefthand "zero" position for size 2, and will move by a distance corresponding, on the film, to the total width of the characters in group 248. It is evident that this will be achieved by a lens displacement, from zero, smaller than the lens displacement that was necessary for the production of characters of group 248 because size 2 is, evidently, larger than size 1.

The distance the new lens must move to leave the proper blank space (distance on the film from the first to the last of the characters of group 248) is determined by the relative width of the characters of group 248 multiplied by the DL factor of size 1 and divided by the DL factor of size 2. This value is computed during the first pass of the lens carriage and stored until required for the control of lens of size 2 to skip the width of group 248.

The characters of group 249 are then flashed, and their accumulated width value is multiplied by the DL factor of lens size 2 and divided by the DL factor of lens size 3 in order to determine the amount of travel the carriage should accomplish before projecting the first character of group 250, in size 3.

The means to accomplish the size mixing explained above is illustrated in FIG. 23. The first part of the line, group 248, will be flashed as in normal operation for lines that do not need mixed point sizes. But this normal operation is altered by a control circuit 252 which will become activated by the point size shift code.

Control circuit 252 will cause the carriage to shift the lens and come back to the initial (zero) position for the lens of size 2. The carriage displacement, with lens of size 2 in position, expressed in relative units of size 2 (DL size 2), is located in a storage shown at 254. The stored value is obtained by taking the accumulated width of the characters of the first group, expressed in relative units and as stored in unit 253, and multiplying that value by the DL factor for size "1", storing the result in unit 254. Then, the value output from unit 254 is divided by the DL factor for size "2", and the result is stored in a storage unit 265 to move the carriage the distance 274 (FIG. 22) with lens of size "2" in position. Then, the projection of characters of group 249 will proceed normally, but the presence of a point-size shift code to signify a shift to lens "3" will again cause the carriage to return beyond its zero position in order to place the size "3" lens in operative position. The accumulated relative width value of group 249 is stored in unit 258 and this value is multiplied by the DL factor for lens 2 is stored in unit 259.

During the carriage return in preparation for the flashing of group 250, two operations are performed. The value stored in unit 256 is divided by the DL factor of size 3 and the result is stored in unit 256. This value represents the distance to be traveled by the carriage from the zero position corresponding to lens 3 to leave a blank space of length 274 (see FIG. 22). Also, the output value from unit 259 is divided by the DL factor of size 3 and stored in unit 260. This value represents the distance the carriage, with lens 3 in operation, will have to move to leave a blank space of length 275. The output values from units 256 and 260 are added and transferred to the lens carriage stopping mechanism to move it by a distance 276 before the first character of the last group if flashed.

Figure 23:
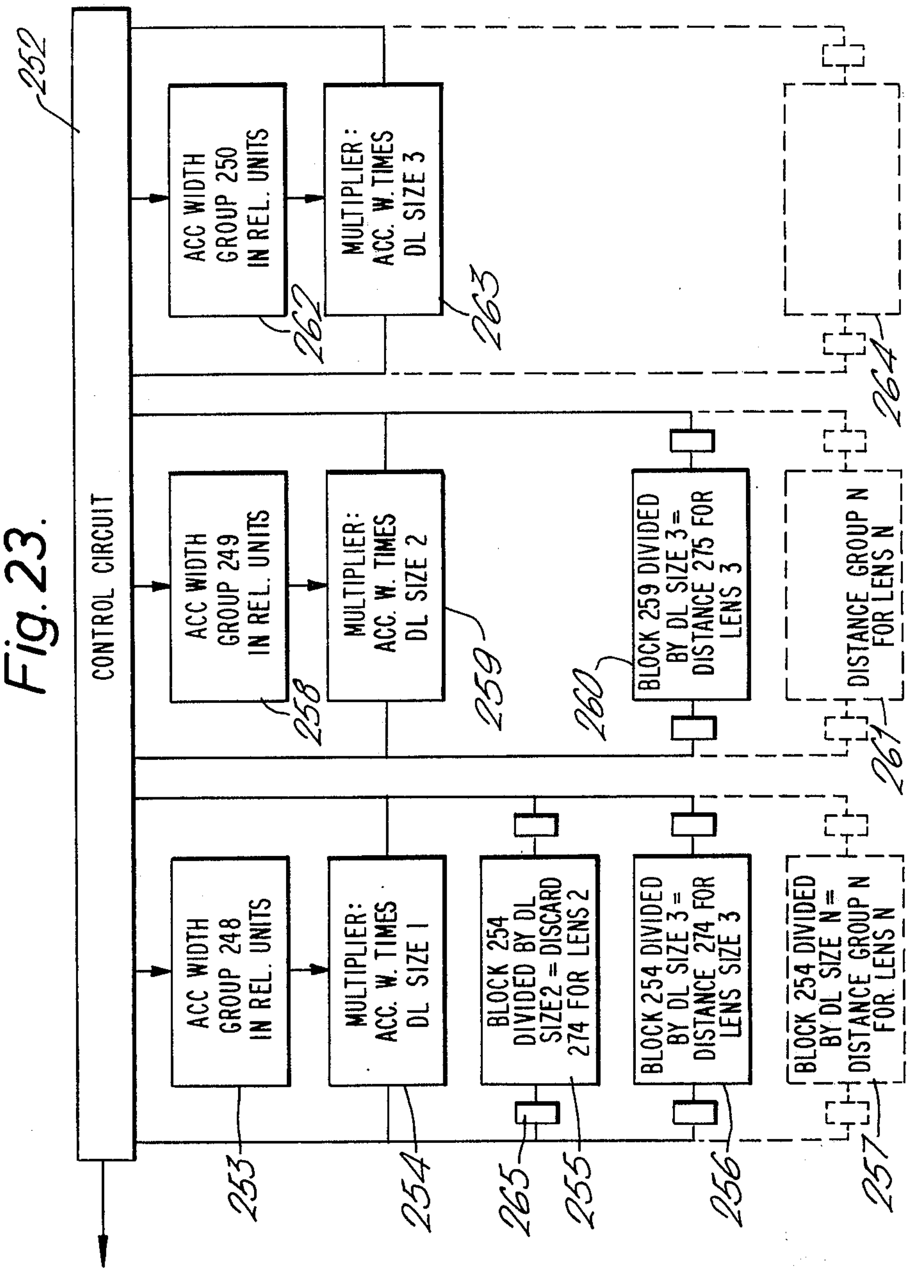
FIG. 23 is a block diagram illustrating the operation of the electronic controller for mixing character sizes in the same line of characters.

It can be seen from FIG. 23 that other line sections of different sizes can be added. In each case, the accumulated width in relative units of each portion of the line multiplied by the DL factor of the point size of each portion is kept in storage, to be divided by the DL factor of the new lens to leave the appropriate blank space.

Figure 24:
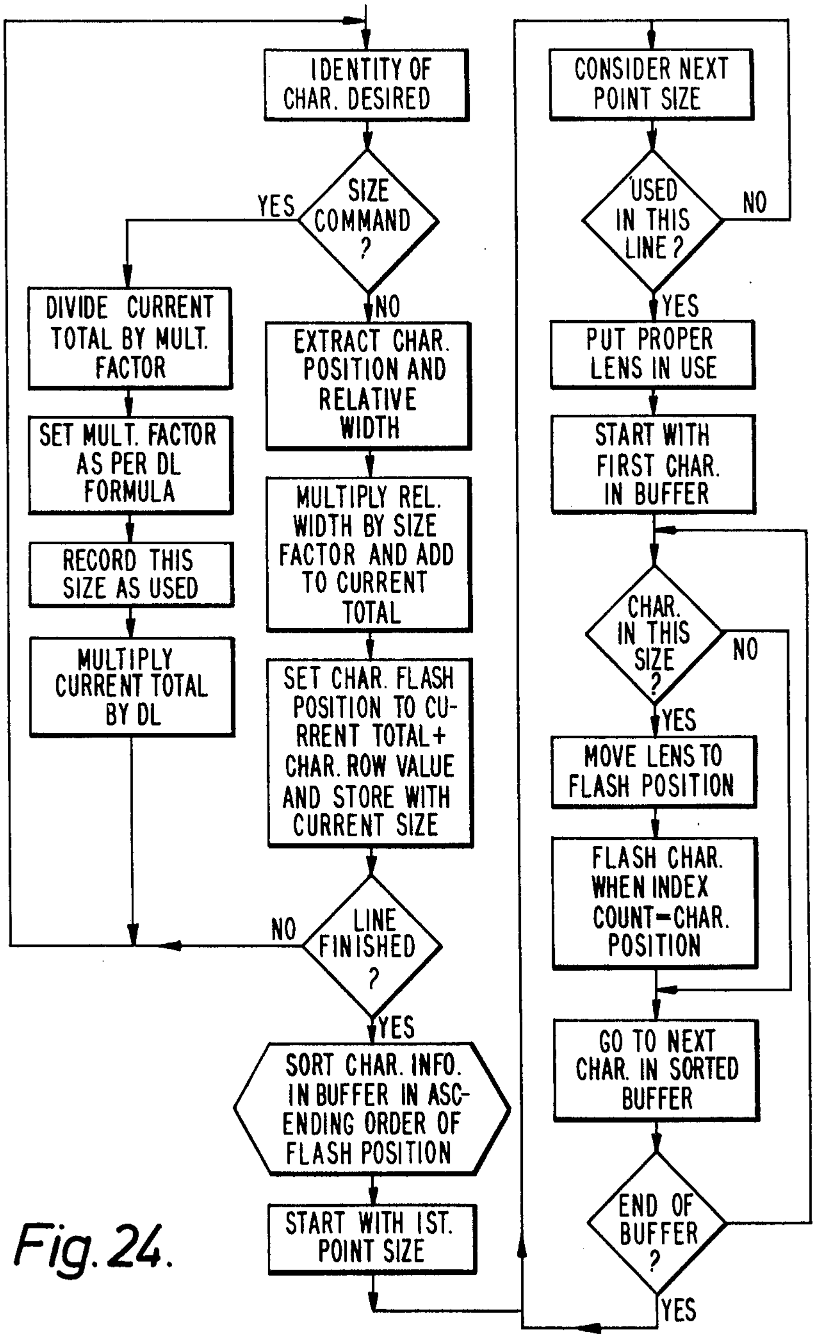
FIG. 24 is a flow diagram of a variant of the control program of the machine.
Figure 25:
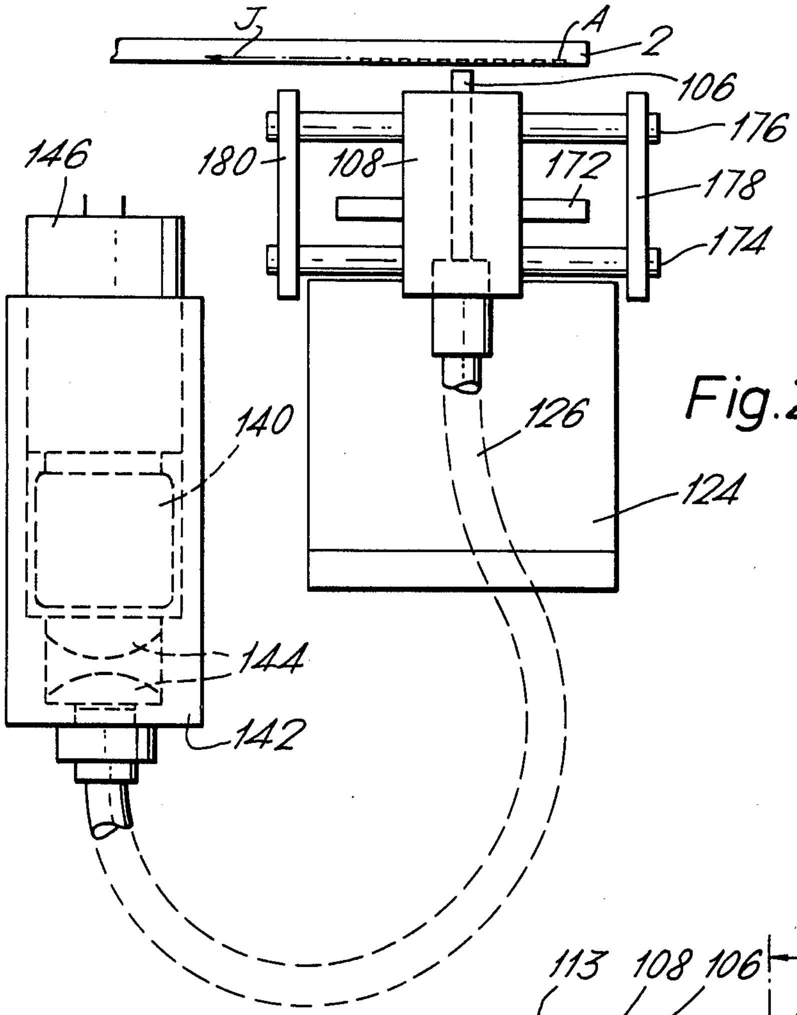
FIG. 25 is a schematic plan view of the flash unit of the invention.

The electronic control of the machine also can be performed by a pre-programmed general purpose digital computer as shown in the flow diagram of FIG. 24. In this case, each character code is stored with its point size and the accumulated width value of the previous character.

FLASH MEANS

The preferred means of illuminating by flash the selected characters are shown in FIGS. 25 to 28. The disc is shown at 2 with rows of characters A–J. A light pipe 106, of a cross-sectional area larger than the largest character on the disc 2 is located as close as possible to the characters on the disc. The light pipe 106 is connected to a fiber-optics bundle 126 which transmits light to the pipe from a flash-lamp 140 whenever the flash lamp is energized.

The trigger circuit of the flash-lamp is shown at 146. The flash-lamp 140 and trigger circuit 146 are mounted in a housing 142 together with a condensing lens assembly 144. The output end of the fiber bundle 126 and the light pipe 106 are clamped into a block of light-weight metal or plastic material 108 by screws (not shown) used to squeeze together the opposite walls of a slit 110 (FIG. 26).

The block 108 is mounted so as to slide freely on rails 174 and 176. The rails are secured to mounting brackets 178 and 180. Thus, the block 108 can move from one extreme position 113 (FIG. 26) to the other extreme position 111, so that the light pipe can be moved adjacent to any selected character row.

Figure 26:
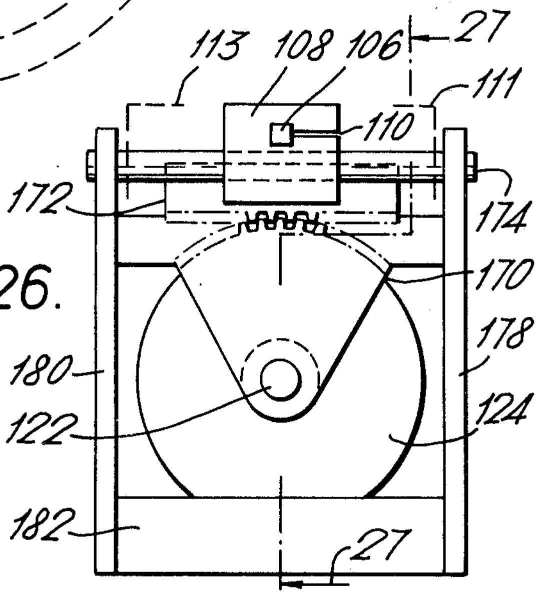
FIG. 26 is an end elevation view of the device of FIG. 25.

Referring now to FIGS. 26 and 27, the sliding block 108 is provided with a rack 172 engaged by a toothed sector 170 pinned to the shaft 122 of a reversible stepping motor 124 which is secured to the base 182 of the flash unit. The stepping motor 124 is controlled in accordance with the rank value to move the light pipe 106 in the forward or reverse direction to the appropriate position opposite the selected row before the selected character is flashed. The average motion of the stepping motor can be reduced by grouping the most frequently used characters in adjacent rows and also by using more than one light pipe and associated circuit.

FIG. 28 shows an arrangement including two light pipes 183 and 187 mounted in a sliding block 95. Each pipe is connected to a separate flash unit 99 or 97 by a fiber-optics bundle 98 or 96. In a preferred embodiment, the light pipes are spaced by a distance approximately equal to one half of the distance from the outermost row A to the innermost row T, as shown in FIG. 28, so that block 95 will never have to travel more than one quarter of the number of rows, or 5 rows for a 20 row disc. As shown in FIG. 29, light pipe 183 on the left and its associated flash circuit will be assigned to rows of group 88 (A to J), and light pipe 187 will be assigned to rows of group 90 (K to T).

An interlocking circuit is used so that no flash can occur before the light pipe assembly is at the proper position and before the lens carriage has reached its proper position. Because of its light weight, low inertia and small maximum number of steps, the light pipe support block 95 or 108 usually will reach its position earlier than the lens carriage reaches its position. It may also be pointed out that little accuracy is required in the positioning of the light pipes because they are designed to illuminate an area substantially larger than the character area of the disc.

TWO-DISC EMBODIMENT

FIGS. 2 and 31 represent a modification that permits the use of two independent discs to increase the number of characters available in the machine. The discs 2 and 26 are mounted on a slide mechanism for motion in the plane of the discs parallel to the direction of motion of the lens carriage so that one or the other of the two discs can be brought into operative position opposite the light-pipe assembly. In FIG. 2, the disc 2 is shown in operative position while the second disc 26 is inoperative.

As shown in FIG. 31, each of the discs is mounted on a slide mechanism 184 slidably mounted on a block attached to the base 30 of the photocomposing machine. Through manual or automatic operation, disc 3 can be moved to the right, as shown in FIG. 2, so that its knob moves from position 3 to position 5, and disc 26 moves also to the right by the same amout from position 27 to position 28. A detent (not shown) is used to lock the disc slide mechanism in its operative position.

One of the discs 26 and 2 can be provided with characters in the position of FIG. 8 for horizontal composition, and the other disc with characters rotated 90 degrees for vertical composition, as shown in FIG. 9. When the characters are in the latter condition, the operation of the machine is not altered except that the character width becomes the character height, and the accumulated width the accumulated height. The use of two discs doubles to total capacity of the machine which, in one embodiment, can reach 10,000 characters.

As an alternative, the two discs can remain located at fixed positions and the distance of travel of the lens and light carriages increased to enable the projection of characters from one disc or the other. In order to do this, the rails 176 (FIG. 2) are lengthened to extend near the disc 26 as indicated by dashed lines 176'. Similarly, rails 22 and 23 are extended to 22', 23', and bracket 24 is moved to the position shown in dashed lines in FIG. 2. The lenses used should have longer focal lengths, too.

HEADLINER ATTACHMENT

An attachment to the basic machine can be utilized to produce long lines of large sizes, such as for newspaper headlines or the like. Referring to FIG. 31, in normal machine operation, the characters are projected from the disc 2 to the film 36 along a plane 223. A mirror 192 can be used, if desired, to reduce the length of the machine.

The headlining attachment includes a collapsible mirror 188 which is pivoted at 189 to move as shown to intercept and deflect the light rays emerging from the desired lens, e.g., lens 34, to produce images on a second sheet of photographic film 190. The film 190 preferably is relatively narrow, just wide enough to accommodate the size of the largest characters, for example, 144 points.

Referring to FIG. 30*a*, a maximum area shown at 49 is assigned to each character on the disc. The location of each character within the area is determined by a base line 57 and a vertical reference line 59. The intersection of these two lines determines the "reference point", which is utilized to space characters horizontally and vertically. In the preferred embodiment, the character areas of the different rows are equally spaced by a distance R (FIG. 30).

In the utilization of the machine for large sizes to produce headlines, the lens carriage is not used to space characters but only for row selection. Seven rows are represented in FIG. 30. For very large magnifications, the lens will be much closer to the matrix than is shown in FIG. 2, but the angle to be covered by the lens will be smaller because it does not have to project more than one row at a time.

Line 267 of FIG. 30 represents the path of travel of a lens producing 72-point characters from a 5-point matrix, and line 268 the path of another lens producing 32-point characters. The identity of each character, as explained above, includes a code representing the row where it is located. This code controls the displacement of the carriage. The displacement of the carriage will also depend on the magnification ratio. In FIG. 30*b*, R represents the distance between rows, D the distance the lens of magnification M should travel to go from one row to another row. P is the object to lens distance and P' the lens to image distance. We have $$P'/P = D/(R - D) \text{ but} \quad (5)$$
$$P'/P = M \text{ the magnification of the lens; so} \quad (6)$$
$$D = M(R - D) \text{ and} \quad (7)$$
$$D = \frac{MR}{1 + M}. \quad (8)$$

For 5-point characters on the disc, $$S = M \times 5 \text{ and} \quad (9)$$
$$M = \frac{S}{5}. \quad (10)$$

Applying the value R = 2.25 mm, the formula becomes $$D = \frac{2.25S}{5 + S}. \quad (11)$$

The value of D for some larger point sizes is shown in FIG. 30*c*, where the size is shown in Column 209 and the value D in millimeters in column 211. These values are stored in the control circuit of the machine. For a given point size, the corresponding value of the table is multiplied by the rank value of the character to be projected. The results represent, for example in millimeters, the distance that the lens will have to travel from a "zero" position (as explained above, the zero position of the carriage depends on the lens in use) to the proper position to project the reference point of the selected character to the projected reference point 271 (FIG. 31*b*) on the film.

A preferred arrangement for the production of headlines is illustrated in FIGS. 32 and 33. Characters forming light beams 223 follow a path 201 after deflection by a mirror 188 to finally impinge on the film 194, which is pressed against a plate 198 by a presser 196.

The following components are mounted on the plate 198: a film supply cassette 208 removably secured by friction by pin 212; the paper feed rollers assembly including the metering roller 222 with idlers 223; the receiving cassette 210, also removably attached to the plate; and a stepping motor 216 for the purpose of driving the metering roller through the pulleys and belt arrangement 218–219 (FIG. 33). Brackets 213 and 215 attached to plate 198 support the roller assembly and bracket 214 supports the stepping motor.

As shown in FIG. 32, the plate 198 is attached to a hub 200 that can rotate in a housing 204 to which it is secured by bearing 202 and spacers that allow free rotation of hub 200 but no axial displacement. The housing 204 is mounted on the frame 206 of the headlining attachement.

The purpose of the arrangement described is to make it possible to rotate by 90 degrees the film head so that the film can be in the position shown at 194 or 195 as shown in FIG. 33. A locking mechanism, not shown, is used to lock plate 198 in the selected position. The arrangement makes it possible to produce, on the narrow strip of film, either lines or columns of characters. The stepping motor 216 is operated by the stepping circuit to properly space characters either according to their width or their height. For optical reasons, in order to achieve higher character quality, the arrangement shown is preferred to the alternative use of a dove prism 225 which would have to be of relatively large dimensions and would introduce aberrations because it would not be located in parallel light.

By use of the headlining attachment shown in FIGS. 32 and 33, the necessity of buying a separate headlining machine is avoided.

PI CHARACTER INSERTION

Figure 34:
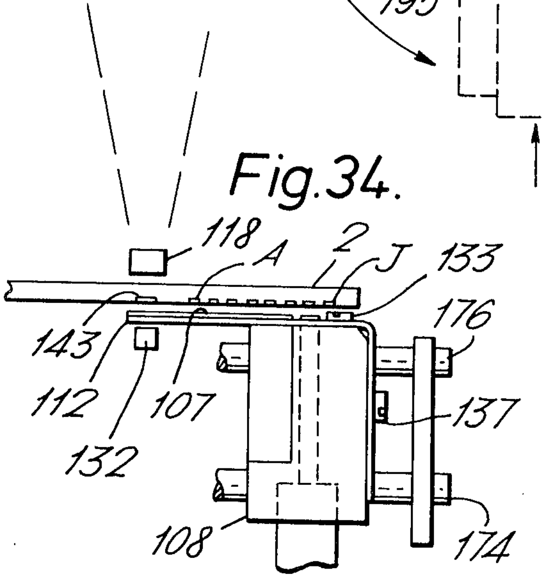
Figure 35:
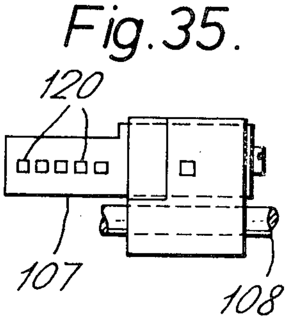
Figure 36:
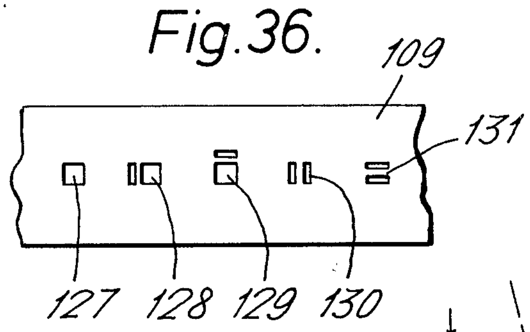
Figure 37:
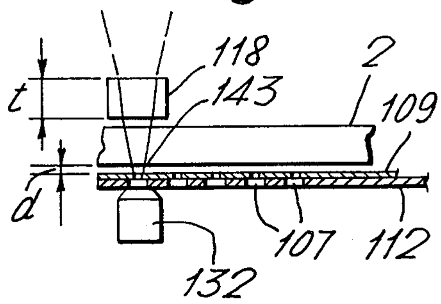

A special attachment for the insertion of Pi characters is shown in FIGS. 34 to 38. Pi-characters such as 127 to 131 of FIG. 36 are located on a piece of film or photographic plate. The light-pipe block shown at 108 in FIGS. 34 and 35 is provided for illuminating the standard characters in rows A–J, and is essentially the same as the corresponding mechanism shown in FIGS. 25 to 27. The block 108 can slide along rails 174 and 176 in the manner explained above.

A sheet-metal bracket secured by screws 133 and 137 to the sliding block 108 has one arm 112 which supports a Pi-bearing character holder 107 which is provided with a plurality of apertures 120 (see FIG. 35), one for each Pi character. The holder 107 holds the film strip 109 of FIG. 36 with each character 127–131 accurately located in the center of one of the apertures 120.

Figure 38:
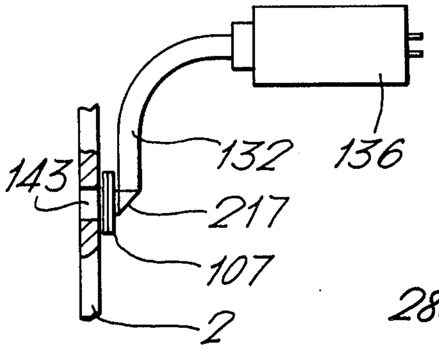

Referring now to FIG. 38, the disc 2 is provided with a clear transparent area (ring) 143. An illuminating system comprising a lamp 136 and light pipe 132 with a prism-shaped output end 217 is provided to project light from the lamp 136 through the disc area 143. The light pipe 132 is shown schematically in FIGS. 34 and 37. The Pi character-bearing extension 107 is located as close as practically possible to the matrix disc 2. Block 108 is moved along rails 174 and 176 not only to select a character row A–J, but also to select a Pi character. Movement of the block 108 positions one of the apertures 120 of FIG. 35 opposite the area 143, thus making it possible to select a Pi character without any drive mechanism other than that provided for standard row selection.

The rotation of the disc does not interfere with the projection of Pi characters, but the distance from the Pi character to the character-bearing surface of the disc must be compensated for in order to focus the image of the Pi character on the film 36. This is achieved simply by locating a glass block 118 (FIG. 37) in the path of the rays emerging from area 143. If the distance between the Pi character surface and the character surface of the disc is "$d$", the thickness "$t$" of block 118 necessary to provide the desired compensation will be given by the equation:

$$t = \frac{d}{1 - \frac{1}{n}} \qquad (12)$$

in which "$n$" is the index of refraction of the glass.

The lamp of illustrating unit 136 need not be a flash lamp because the Pi character matrix and the lamp both are stationary during character projection. Therefore, the lamp can be a simple incandescent lamp which is turned on for as long as desired to create the desired degree of exposure on the film 36.

"Rules" can be inserted by use of the square aperture 127 (FIG. 36). To produce horizontal rules, this character is moved to the projection position, the lamp unit 136 is turned on, and the lens carriage is moved continuously, thus producing a horizontal line on the film 36. To produce vertical lines, the same procedure is used, except that the film feed mechanism is moved continuously instead of the lens carriage.

For a relatively large number of Pi characters, the second disc 26 in FIG. 2 can be replaced by a smaller disc provided with interchangeable pieces of film that can have the same pie shape of the segments described in U.S. Pat. No. 3,886,566. Each segment bears a number of Pi characters. The disc also can be replaced by a drum.

DISC PRODUCTION

The preferred method for the production of discs will be described with reference to FIGS. 29 and 39–41. As shown in FIG. 29, the disc 2 can be divided in two groups of ten rows, group 88 with its controlling slits 6 and group 90 with its controlling slits 8. The manufacture of a master matrix is preferably made by projecting several of the characters of different rows in alignment with the projection line and its timing slit. The projection of twenty master characters to cover the total width of the character-bearing area of the disc has been found to be rather costly because it necessitates either a great distance from the master character board to the lens, or a large angle lens which would make it difficult to provide for the high degree of resolution necessary for certain ideographic characters. But the projection of groups of 10 characters at a time can be accomplished at a relatively low cost. Therefore, the final matrix disc of FIG. 1 is produced by successive contact printing of two masters.

The master shown in FIGS. 39 and 41 is a glass plate bearing an appropriate photographic emulsion. The plate is mounted on a jig on which it is centered by an accurate hole provided in a bushing 282 (FIG. 41) which is cemented onto the glass plate. Each line of 10 characters in group 90 (FIG. 29) and the associated slit 8 is photographed successively.

A second master, shown in FIG. 40, is produced by successive photography of the characters of group 88 and their associated slits 6. Although it is not apparent from the drawings, the area of each master disc which is not provided with characters is opaque.

Each master is successively mounted on a jig provided with a centering pin engaging the hole of busings 282 to contact-print, for example, on a disc of film, the characters of each of the master discs. Means such as pin 293 can be used to assure an accurate relationship between a slit of group 88 and the corresponding slit of group 90, such as slits 6 and 8 of FIG. 29. It is an advantage of the invention that the slits and their associated groups of characters on different masters do not have to be aligned with extreme accuracy because each slit controls its own group of rows.

Each master character mounted on a panel for projection to each master disc preferably is transparent on an opaque background so as to produce a positive master disc (opaque characters on a transparent background) so that the matrix disc obtained by contact printing bears transparent characters on an opaque background.

The above method can be utilized to produce discs on either flexible material such as photographic film, or on rigid material such as glass plates. Also, a modified method makes it possible to produce Pi-shaped segments.

COMPOSITE DISCS

To reduce the cost of the disc, it is possible to use a disc made of film which is sandwiched between two plates of transparent but rigid material such as glass. Alternatively, the film can be kept flat against one rigid surface by the use of static charges.

In another alternative, shown in FIGS. 42 through 45, the use of a large-diameter glass or plastic disc is avoided by securing a large film disc between two circular plates of substantially smaller diameter. The peripheral portion of the film bearing the characters extends radially beyond the edges of the plates and tends to move easily due to its flexibility, because it is maintained in a flat plane by air pressure produced by an air compressor, if the flow of air created by the rotation of the disc is not sufficient.

Referring to FIG. 42, the principle used in this feature of the invention to permit the use of a flexible disc is to ensure that the area 294 of the disc at the exposure position is reasonably flat and accurately positioned, despite the fact that the rest of the disc is free to move erratically. The area 294 is slightly larger than that occupied by the characters in line 11 of FIG. 29. As noted above, this is accomplished, preferably, by the use of compressed air.

A shown in FIG. 43, a flexible disc 266 made of film is secured between a rigid circular base plate 287 pinned to the disc drive shaft 283, and a removable circular plate 285. Plate 285 is pressed against the disc 266 by a tapped knob 286 engaging the threaded end portion of the shaft 283. A soft material such as rubber (shown at 295, FIG. 44) preferably is attached to the inside of plate 288. The outside diameter of these two plates is smaller than the diameter of the row of the inner timing slits 8 (FIG. 29), so that the peripheral disc portion shown in FIG. 29 extends radially beyond the two circular plates. The plates advantageously can be made of metal or other opaque material which does not deform greatly under the centrifugal forces caused by rotation at high speeds. The lightweight and short radial length of the peripheral film portion minimize its deformation under the same forces.

As shown more clearly in FIGS. 44 and 45, a housing for the peripheral area of the disc is provided by a pair of plates 284 and 285. Each plate has a cross-sectional shape as shown forming a slot 289 giving a clearance of a few thousandths of an inch on each side of disc 266. Each plate 284, 285 has annular flanges 291 and 292 extending closer to the outer edge of disc 266 so as to leave substantially less freedom for the disc 266 to move out of the desired plane. The area of the disc confined between flanges 291 and 292 is void of characters or timing slits because, under certain conditions, it may rub against the flanges. The inside surfaces of plates 284 and 285 preferably are covered with teflon or an equivalent low-friction material to avoid damaging the disc 266.

The rotation of the disc creates air flow in the slot 289 which tends to maintain the disc at substantially equal distances from each plate. If desired, opposed pressurized air jets can be directed into the slot 289 through holes such as 290 spaced around the disc housing to keep the film stable.

Each guide plate 284, 285 is secured to the base of the machine by a bracket 301 and 302, and there is an aperture window in each plate at 294, FIG. 42, to permit character projection. Circular plate 285 and its bracket 302 are removable (but accurately located by pins) to facilitate the interchangeability of character matrix discs.

ELECTRONIC CORRECTION OF CHARACTER LOCATION ERRORS

FIG. 46 shows electronic means to check and correct the accuracy of discs, particularly to determine their concentricity and to detect deformations which would cause errors in base-line location of characters and character spacing.

The disc 2 preferably is located between the centering plates 284 and 285 described above. The base of the disc checking unit is shown at 141. A lens 63 capable of relatively large magnification, for example ten to one, is mounted on the lens carriage 12 (not shown in FIG. 46). The disc is provided with a number of reference boxes such as shown in FIG. 30*a*, with reference lines (transparent on an opaque background) such as 57 for base alignment and 59 for spacing accuracy. There can be a line of such boxes (one per row) for each segment 10 of the disc 2 if the disc is segmented as indicated in FIG. 1. The lens 63 is moved by the carriage from row to row, as shown in FIG. 30, in order to project the base line image of each row successively to an array of miniature photodiodes 298 spaced apart, for example, by a distance of 4 thousandths of an inch.

A line 296 represents the projection line of a perfectly-aligned character. Another line 297 represents the light path followed by the base line of a character too far away from the center of the disc. As the disc rotates, one (or more) base line is flashed for each character from one row during a revolution, then the lens carriage moves to the adjacent row to flash all the base lines of this row, and so on.

If the disc is divided into 8 segments as shown in FIG. 1, and if there are 20 reference lines per segment, a total of 160 flashes will occur. The base line images that are off the theoretically perfect line 296 will energize a photodiode higher or lower than the reference diode. The energized diode will be identified by circuit 299 and the amount of deviation from normal will be stored in storage unit 300 which can be a tape or disc storage unit.

In order to correct certain of the errors, the flash timing can be adjusted, for example as explained in U.S. Pat. No. Re 27,374 by delaying the triggering of the flash circuit. This can be accomplished by introducing a fixed delay for perfectly aligned characters projected along line 296, and delaying other characters more or less. Of course, the delay introduced into the control circuit of the machine and associated with each character or group of characters will depend on which of the photodiodes of the array is energized, and on the speed of the character when it intersects the exposure line. Let us assume, for example, that a character of the outside row A of diameter 269 mm energizes the photodiode associated with line 297, and that this photodiode is 0.80 mm away from the "neutral" diode associates with line 296. With a disc rotating at 20 revolutions per second, the speed of the character is approximately 17,000 millimeters per second or 0.017 mm per microsecond. Therefore, the flash delay for this particular character will be 80/1.7 divided further by the magnification ratio of 10, or 4.7 micro-seconds. In practice, it is not usually necessary to make a different correction for every row. An average is usually sufficient to insure an acceptable base alignment of characters.

An advantage of the accuracy checking system is evident from the foregoing example; the magnification provided by the lens 63 amplifies the deviation of the character placement from normal so that by the time the images reach the detector 298 the deviation is relatively large. This permits the use of relatively more widely spaced photodiode detectors to detect small deviations, thus increasing the resolution of the checking system.

The above description of the invention is intended to be illustrative and not limiting. Various changes or mofidications in the embodiments described may occur to those skilled in the art and these can be made without departing from the spirit or scope of the invention. For example, it is within the scope of the present invention to use a spinning drum instead of a disc as a character matrix.

I claim:

1. A photocomposing device comprising, in combination, a movable character matrix bearing a plurality of arrays of characters, matrix drive means for moving said arrays past a projection station, illuminating means for selectively illuminating said characters, projection means for projecting images of said characters onto a recording surface, spacing means for spacing successive ones of said images on said recording surface in linear groups, control means for detecting the characters in each of said groups, determining the order of projection necessary to prevent reversal of direction by said spacing means during composition of said linear group, and causing said characters to be projected in said order.

2. A device as in claim 1 in which said characters are ideographic, including means for selecting among said arrays of characters on said matrix by positioning said illuminating means adjacent one of said arrays, said projection means including at least one lens mounted on a movable lens carriage, said spacing means comprising drive means to move said lens carriage.

3. A device as in claim 2 in which said character matrix is a round rotatable member, said arrays being substantially circular and being arranged to move past a projection line perpendicular thereto, said lens carriage and said illuminating means being movable in a direction parallel to said projection line and parallel to said recording surface.

4. A device as in claim 1 in which said control means includes means for determining the displacement value for each of said characters in said one group, sorting means for sorting said displacement values in order of increasing or decreasing value and thus determining the order of projection of said characters.

5. A device as in claim 4 in which said character matrix is a round rotatable member, said arrays being substantially circular, said displacement value comprising a row value locating the row from a reference position on said matrix, added to the accumulated width of the characters preceding or subsequent to the character, and including means for multiplying each displacement value by a size factor.

* * * * *